United States Patent
Ryali et al.

(10) Patent No.: US 12,020,692 B1
(45) Date of Patent: Jun. 25, 2024

(54) SECURE INTERACTIONS IN A VIRTUAL ENVIRONMENT USING ELECTRONIC VOICE

(71) Applicant: Bank of America Corporation, Charlotte, NC (US)

(72) Inventors: Venkata Karthik Ryali, Hyderabad (IN); Durga Prasad Kutthumolu, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 18/318,895

(22) Filed: May 17, 2023

(51) Int. Cl.
 *G10L 15/08* (2006.01)
 *G06F 21/32* (2013.01)
 *G06T 15/00* (2011.01)
 *G10L 13/02* (2013.01)

(52) U.S. Cl.
 CPC .............. *G10L 15/08* (2013.01); *G06F 21/32* (2013.01); *G06T 15/00* (2013.01); *G10L 13/02* (2013.01); *G10L 2015/088* (2013.01)

(58) Field of Classification Search
 CPC ... G10L 15/08; G10L 13/02; G10L 2015/088; G06F 21/32; G06F 2221/2141; G06F 1/163; G06F 21/34; G06F 21/44; G06F 21/31; G06F 21/33; G06F 21/30; G06F 21/6209; G06T 15/00; H04L 63/0861; H04L 9/0863; H04L 9/0861; H04L 2209/56; H04L 2463/081; H04L 9/3231; H04L 63/0838; H04W 12/33; H04W 12/06; H04W 12/02; H04W 12/068; H04W 12/069; H04W 4/00; G16H 10/60; G06Q 20/3223; G06Q 20/10; G06Q 20/326; G06Q 20/3263; G06Q 20/3265; G06Q 20/02; G06Q 20/065; G06Q 20/321; G06Q 20/06; G06Q 20/32

See application file for complete search history.

(56) References Cited

U.S. PATENT DOCUMENTS

| | | |
|---|---|---|
| 7,467,356 B2 | 12/2008 | Gettman et al. |
| 8,082,297 B2 | 12/2011 | Syvain et al. |
| 8,113,959 B2 | 2/2012 | Judicibus |
| 8,788,957 B2 | 7/2014 | Reville et al. |

(Continued)

FOREIGN PATENT DOCUMENTS

| | | |
|---|---|---|
| CN | 113516462 A | 10/2021 |
| WO | 2021155480 A1 | 8/2021 |

*Primary Examiner* — Greg C Bengzon

(57) ABSTRACT

A system includes a memory and a processor coupled to the memory. The processor receives a voice command from a first user to transfer a first amount of data objects from a first data file of the first user to a second data file of a second user. The processor generates a voice signature of the first user and further generates a virtual device in the virtual environment, wherein the virtual device comprises metadata relating to the transfer of the data objects. The processor presents the virtual device and the voice signature to the second user in the virtual environment. The processor receives a selection from the second user of the voice signature and plays the voice signature on a second user device of the second user. The processor receives an acknowledgement from the second user and initiates the requested transfer of data objects to the second user.

20 Claims, 3 Drawing Sheets

(56) References Cited

U.S. PATENT DOCUMENTS

| | | |
|---|---|---|
| 9,106,616 B2 * | 8/2015 | Carro .................. H04L 63/123 |
| 9,165,426 B2 | 10/2015 | Jones et al. |
| 9,566,518 B2 | 2/2017 | Branson et al. |
| 9,871,774 B1 * | 1/2018 | Liu ...................... H04L 63/0435 |
| 10,218,649 B2 | 2/2019 | Joo et al. |
| 10,326,667 B2 | 6/2019 | Jones et al. |
| 10,388,286 B1 * | 8/2019 | Mossoba ............ H04L 63/0861 |
| 10,552,819 B1 * | 2/2020 | Gupta ................ G06Q 20/3272 |
| 10,902,437 B2 | 1/2021 | Bhogal, II et al. |
| 10,970,934 B2 | 4/2021 | Rogers et al. |
| 11,216,801 B2 * | 1/2022 | Bohra ................ G06Q 20/3272 |
| 11,249,714 B2 | 2/2022 | Spivack et al. |
| 11,429,948 B2 * | 8/2022 | Lipshultz ............. G06Q 20/386 |
| 2009/0094163 A1 * | 4/2009 | Shastry ................ G06Q 20/102 |
| | | 705/40 |
| 2009/0158150 A1 | 6/2009 | Lyle et al. |
| 2009/0271436 A1 | 10/2009 | Reisinger et al. |
| 2010/0228633 A1 | 9/2010 | Guimaraes et al. |
| 2010/0285775 A1 * | 11/2010 | Klein ...................... H04L 63/10 |
| | | 455/411 |
| 2011/0072367 A1 | 3/2011 | Bauer |
| 2015/0200950 A1 * | 7/2015 | Meunier ................ G06F 21/10 |
| | | 726/4 |
| 2015/0371215 A1 * | 12/2015 | Zhou ...................... G06F 3/041 |
| | | 705/64 |
| 2017/0262855 A1 | 9/2017 | Venugopalan et al. |
| 2019/0205468 A1 * | 7/2019 | Barnes, Jr. .............. G10L 15/26 |
| 2019/0377417 A1 * | 12/2019 | Friedman ............ H04L 63/0861 |
| 2020/0020172 A1 | 1/2020 | Rogers et al. |
| 2020/0097952 A1 * | 3/2020 | Piparsaniya ............ G06F 3/167 |
| 2020/0228524 A1 * | 7/2020 | Szafranski ............... A63F 13/79 |
| 2020/0244800 A1 | 7/2020 | Engelke et al. |
| 2020/0338458 A1 | 10/2020 | Huang et al. |
| 2021/0173916 A1 * | 6/2021 | Ortiz ...................... H04L 9/3213 |
| 2021/0374689 A1 * | 12/2021 | Bansal ............... G06Q 20/3829 |
| 2022/0029981 A1 * | 1/2022 | Mavani .................... G06F 3/167 |
| 2022/0270162 A1 * | 8/2022 | Sparks .................. G06F 3/0484 |
| 2022/0351124 A1 | 11/2022 | Altieri |
| 2022/0374878 A1 * | 11/2022 | Andral ............ G06Q 20/40145 |
| 2023/0005206 A1 | 1/2023 | Yoo et al. |
| 2023/0034686 A1 | 2/2023 | Zheng |
| 2023/0067630 A1 * | 3/2023 | Dunjic ................ G06Q 20/382 |
| 2023/0138176 A1 * | 5/2023 | Soryal .................... G06N 20/00 |
| | | 726/7 |
| 2023/0260501 A1 * | 8/2023 | Trueba ................... G10L 15/02 |
| | | 704/200 |
| 2023/0360040 A1 * | 11/2023 | Childe ............... G06Q 20/0655 |

\* cited by examiner

SECURE INTERACTIONS IN A VIRTUAL ENVIRONMENT USING ELECTRONIC VOICE

TECHNICAL FIELD

The present disclosure relates generally to network communication, and more specifically to secure interactions in a virtual environment using electronic voice signature.

BACKGROUND

In a network environment, user devices are in data communication with other user devices that may be distributed anywhere in the world. These network environments allow data and information to be shared among these devices. Some of the technical challenges that occur when data is exchanged between devices are controlling data leakage, unauthorized access to data, and preventing malicious activities. Data storing user devices, such as computers, laptops, augmented reality devices, virtual reality devices, and smartphones, are vulnerable to attacks. This vulnerability poses several network security challenges. Existing systems are typically unable to detect a malicious attack until after the attack has occurred. For example, a bad actor may pretend to be another user in a virtual environment which then allows the bad actor to gain access to other users' information.

SUMMARY

The system and methods implemented by the system as disclosed in the present disclosure provide technical solutions to the technical problems discussed above by allowing a user to perform secure data interactions in a virtual environment. The disclosed system and methods provide several practical applications and technical advantages.

For example, the disclosed system and method provide the practical application of performing secure data interactions in a virtual environment (e.g., metaverse environment) using voice-based authentication. As described in embodiments of the present disclosure, a virtual-world server processes a data interaction requested by a first user to transfer first virtual data objects from a first virtual data file associated with the first user to a second virtual data file associated with a second user using voice command only issued by the first user. The techniques discussed herein allow the first user to transfer first virtual data objects to the second virtual data file associated with the second user by using voice commands alone without having to login to the virtual-world server (e.g., by providing a user credential) and/or entering the virtual environment (e.g., via a first avatar). By allowing the first user to perform a secure data interaction associated with the first virtual data file using voice command(s) alone, the disclosed system and method save the time and resources (e.g., processing resources, memory resources, network bandwidth etc.) which would otherwise be expended to have the first user login to the virtual-world server using a user credential, render at least a portion of the virtual environment and the first avatar on a first user device of the first user, and receiving selections made by the first user in the virtual environment to initiate the data interaction. Thus, the disclosed system and method improve the speed of processing a data interaction in the virtual environment and further improve processing efficiency of the virtual-world server as well as the first user device. In addition, by using voice signatures to verify interactions in the virtual environment, the disclosed system and method improve data security in the virtual environment 102.

The disclosed system and method provide the additional practical application of improving interoperability of real-world systems and virtual world systems (e.g., metaverse systems) so that information may be shared between these systems to implement data security, authorization of data interactions and other data interactions performed in real-world and virtual environments. For example, user information collected from a user and/or assigned to the user in a real-world environment may be used in a virtual environment (e.g., metaverse environment) to authenticate the user before allowing the user to access the real-world user information and perform any kind of action or interaction within the virtual environment. Additionally, user information collected from the user and/or assigned to the user in the real-world environment may be used in the virtual environment (e.g., metaverse environment) to authenticate a virtual entity in the virtual environment before allowing virtual data interactions to take place between the user and the virtual entity. This process provides improved information security because it involves two-way authentication including authenticating that an avatar is associated with the user and not some un-authorized third party as well as authenticating that the virtual entity is associated with the intended real-world entity/organization and not some unauthorized entity, before a data interaction can take place between the user and the virtual entity. This two-way authentication is important to help ensure that both parties engaged in a virtual interaction session are genuine parties and to avoid data scams including theft of user data and data objects.

Thus, the disclosed system and methods improve data security in the virtual environment. By improving data security in virtual environment, the disclosed system and methods generally improve technology related to performing secure data interactions in a virtual environment.

The disclosed system and methods provide the additional practical application of saving memory resources. The seamless data flow between the real-world systems and virtual-world systems as a result of interoperability of these systems allows each system to store less data by avoiding the same data to be stored in both system, as data stored in one system can be accessed by the other system. This saves memory resources by avoiding duplication of data. The saving of memory resources may leave more system memory for storing critical data for use in data processing. This provides the additional technical advantage of improving processing efficiency of computing systems that manage the real-world and virtual word environments.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Example System

Figure 1:
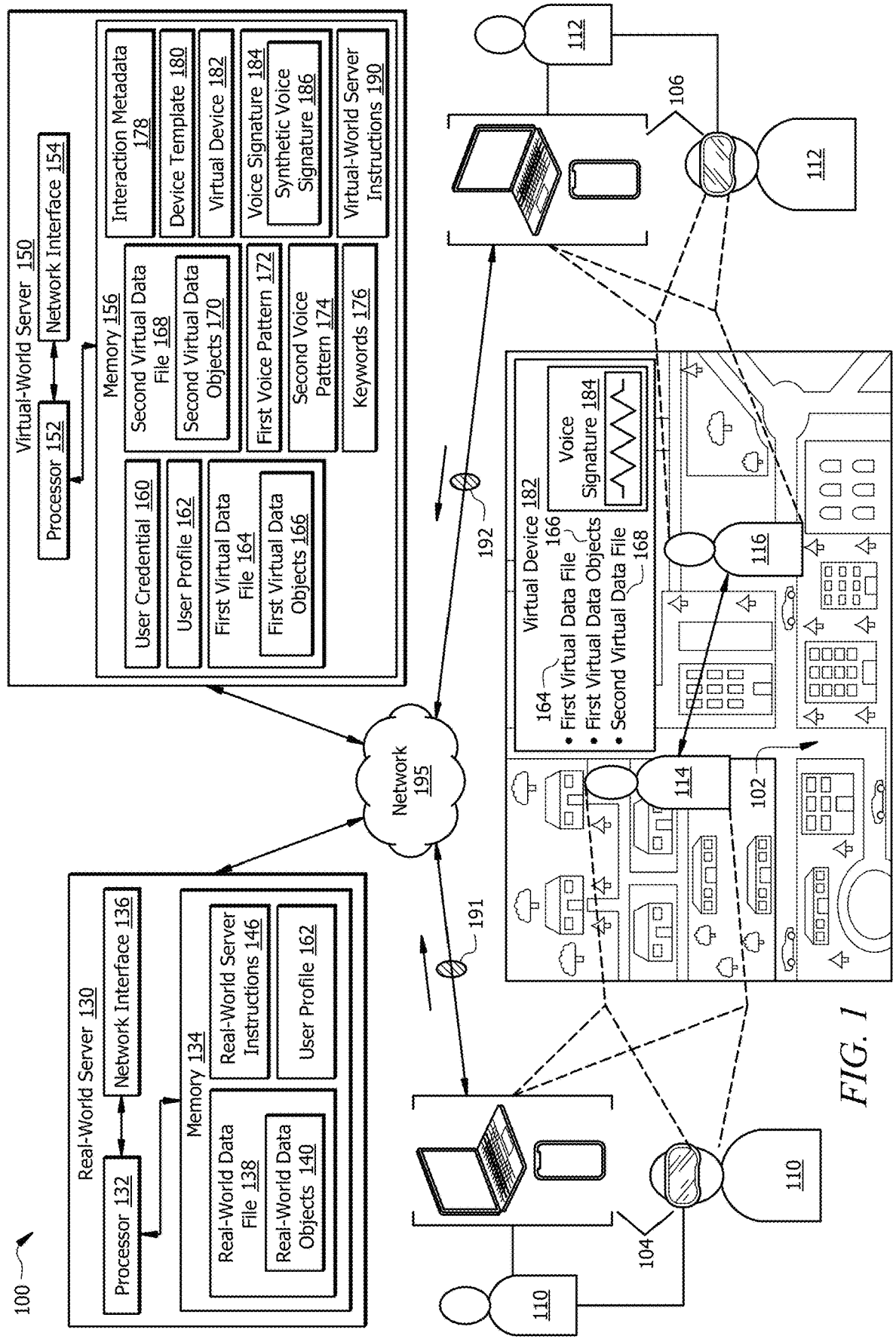
FIG. 1 is a schematic diagram of a system, in accordance with certain aspects of the present disclosure.

FIG. 1 is a schematic diagram of a system 100, in accordance with certain aspects of the present disclosure. System 100 may include a first user device 104, a second user device 106, real-world server 130, and a virtual-world server 150, each connected to a network 195. A first user 110 is associated with the first user device 104 and a second user 112 is associated with the second user device 106. The system 100 may be communicatively coupled to the communication network 195 and may be operable to transmit data between each one of the first user device 104, second user device 106, real-world server 130, and virtual-world server 150 through the communication network 195.

In general, the system 100 may improve interoperability of real-world systems and virtual world systems (e.g., metaverse systems) so that information may be seamlessly shared between these systems to implement data security, authorization of data interactions, access to a virtual environment 102 (e.g., metaverse environment), access to entities within the virtual environment 102 and other data interactions performed in real-world and virtual environments. For example, user information collected from a user (e.g., first user 110) and/or assigned to the user in a real-world environment may be used in the virtual environment 102 (e.g., metaverse environment) to authenticate the first user 110 before allowing the first user 110 to access the virtual environment 102 and perform any kind of action or interaction within the virtual environment 102. For example, a first voice pattern 172 associated with a voice of the first user 110 collected from the first user in the real-world environment may be used to authenticate the first user before allowing the first user 110 to perform an interaction within the virtual environment. Additionally or alternatively, user information collected from the first user 110 and/or assigned to the first user 110 in the real-world environment or virtual environment 102 may be used in the virtual environment 102 (e.g., metaverse environment) to provide the first user 110 access to products, services and/or experiences within the virtual environment 102. This process provides improved information security because it authenticates that a first avatar 114 is associated with the first user 110, not an unauthorized party, and that the first user 110 is authorized to access the virtual environment 102, obtain products, services and experiences within the virtual environment 102 and perform data interactions. Further, a user may obtain a product, service or experience by transferring real-world data objects between real-world entities based on data interactions performed in the virtual environment 102.

It may be noted that the terms "real-world" and "real-world environment" in this disclosure refer to any non-virtual environment where users (e.g., users 110 and 112) can physically interact with real persons and objects. A real-world data interaction may refer to any data interaction performed outside the virtual environment 102 (e.g., a metaverse environment). Further, it may be noted that while certain embodiments of the present disclosure may be described in the context of a metaverse environment which is an example of a virtual environment 102, the methods discussed in this disclosure apply to any other virtual environment 102. The terms "virtual environment" and "metaverse environment" are used interchangeably throughout this disclosure. Furthermore, it may be noted that while certain embodiments of this disclosure describe one or more operations in relation to the first user 110, these embodiments apply to any other user (e.g., second user 112) connected to network 195.

The first user 110 may access the virtual environment 102 (e.g., a metaverse environment) through the first user device 104. The first user device 104 is configured to display a two-dimensional (2D) or three-dimensional (3D) representation of the virtual environment 102 to the first user 110. Examples of a virtual environment 102 may include, but are not limited to, a graphical or virtual representation of a metaverse, a map, a building interior, a landscape, a fictional location, an alternate reality, or any other suitable type of location or environment. The virtual environment 102 may be configured to use realistic or non-realistic physics for the motion of objects within the virtual environment 102. For example, some virtual environments 102 may be configured to use gravity whereas other virtual environments 102 may not be configured to use gravity. Within the virtual environment 102, each user may be associated with an avatar (such as the first avatar 114 for the first user 110). An avatar is a graphical representation of a user at a virtual location within the virtual environment 102. In embodiments, the virtual location of the avatar may be correlated to the physical location of a user in the real-world environment. Examples of an avatar may include, but are not limited to, a person, an animal, or an object. In some embodiments, the features and characteristics of the avatar may be customizable, and user defined. For example, the size, shape, color, attire, accessories, or any other suitable type of appearance features may be specified by a user. By using an avatar, a user is able to move within the virtual environment 102 to interact with one or more avatars and objects within the virtual environment 102 while independently remaining at a physical location in the real-world environment or being in transit in the real-world environment.

While engaging in the virtual environment 102 via the first avatar 114, the first user 110 may interact with a plurality of other users, objects and/or entities through a respective avatar. For example, the second user 112 may attempt to engage in an interaction session with the first avatar 114 through a second avatar 116 associated with the second user 112. In another example, the first avatar 114 of the first user 110 may access a virtual sub-environment (not shown) within the virtual environment 102 and perform virtual data interactions within the virtual sub-environment. In the real-world environment, the second user 112 may be physically located at a distance away from the first user 110. The second user 112 may access the virtual environment 102 through the second user device 106 to control the second avatar 116 and attempt to engage in an interaction session with the first user 110 through the first avatar 114.

Before the interaction between the first avatar 114 and the second avatar 116 occurs, the virtual-world server 150 may authenticate that the first avatar 114 is associated with the first user 110 and not an unauthorized third-party. For example, the first user 110 may be required to sign into a secure portal that provides access to a data file (e.g., real-world data file 138 and/or first virtual data file 164) associated with the first user 110. As shown in FIG. 1, a real-world data file 138 of the first user 110 is stored and managed by the real-world server 130 and a first virtual data file 164 of the first user 110 is stored and managed by the virtual-world server 150. Similarly a second virtual data file 168 associated with the second user 112 is managed by the virtual-world server 150. It may be noted that the discussion relating to the first virtual data file 164 associated with the first user 110 applies to the second virtual data file 168 associated with the second user 112. In one or more embodiments, the virtual-world server 150 may employ single sign-on (SSO), multifactor authentication, or any other suitable authentication scheme in order to allow the first user 110 access to the first virtual data file 164. Similarly, the real-world server 130 may employ single sign-on (SSO), multifactor authentication, or any other suitable authentication scheme in order to allow the first user 110 access to the real-world data file 138. The first virtual data file 164 and the real-world data file 138 may include first virtual data objects 166 and real-world data objects 140 respectively owned by the first user 110. Similarly, the second virtual data file 168 associated with the second user 112 may include second virtual data objects 170 owned by the second user 112. The real-world server 130 and the virtual-world server 150 may store other information related to the first user 110 including, but not limited to, user profile 162, account information (e.g., including identity and other details relating to the respective data files 138 and 164), avatar information, digital assets (e.g., respective real-world data objects 140 and first virtual data objects 166) information, or any other suitable type of information that is associated with a user within the virtual environment 102 and/or the real-world environment. As further described below, user profile 162 associated with the first user 110 may store a first voice pattern 172 associated with the first user 110. Additionally or alternatively, a user profile 162 associated with the second user 112 may store a second voice pattern 174 associated with the second user 112.

As shown in FIG. 1, virtual-world server 150 comprises a processor 152, a memory 156, and a network interface 154. The processor 152 comprises one or more processors operably coupled to the memory 156. The processor 152 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 152 may be a programmable logic device, a microcontroller, a microprocessor, or any suitable combination of the preceding. The processor 152 is communicatively coupled to and in signal communication with the memory 156. The one or more processors are configured to process data and may be implemented in hardware or software. For example, the processor 152 may be 8-bit, 16-bit, 32-bit, 64-bit or of any other suitable architecture. The processor 152 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions (e.g., virtual-world server instructions 190) to implement the virtual-world server 150. In this way, processor 152 may be a special-purpose computer designed to implement the functions disclosed herein. In one or more embodiments, the virtual-world server 150 is implemented using logic units, FPGAs, ASICs, DSPs, or any other suitable hardware. The virtual-world server 150 is configured to operate as described with reference to FIGS. 1 and 3. For example, the processor 152 may be configured to perform at least a portion of the method 300 as described in FIG. 3.

The memory 156 comprises one or more disks, tape drives, or solid-state drives, and may be used as an over-flow data storage device, to store programs when such programs are selected for execution, and to store instructions and data that are read during program execution. The memory 156 may be volatile or non-volatile and may comprise a read-only memory (ROM), random-access memory (RAM), ternary content-addressable memory (TCAM), dynamic random-access memory (DRAM), and static random-access memory (SRAM).

The memory 156 is operable to store user credential 160, user profile 162, first virtual data file 164, first virtual data objects 166, second virtual data file 168, second virtual data objects 170, first voice pattern 172, second voice pattern 174, keywords 176, interaction metadata 178, device template 180, virtual device 182, voice signature 184 including a synthetic voice signature 186 and the virtual-world server instructions 190. The virtual-world server instructions 190 may include any suitable set of instructions, logic, rules, or code operable to execute the virtual-world server 150.

The network interface 154 is configured to enable wired and/or wireless communications. The network interface 154 is configured to communicate data between the virtual-world server 150 and other devices, systems, or domains (e.g. user devices 104 and 106 and real-world server 130). For example, the network interface 154 may comprise a Wi-Fi interface, a LAN interface, a WAN interface, a modem, a switch, or a router. The processor 152 is configured to send and receive data using the network interface 154. The network interface 154 may be configured to use any suitable type of communication protocol as would be appreciated by one of ordinary skill in the art.

The real-world server 130 comprises a processor 132, a memory 134, and a network interface 136. The processor 132 comprises one or more processors operably coupled to the memory 134. The processor 132 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 132 may be a programmable logic device, a microcontroller, a microprocessor, or any suitable combination of the preceding. The processor 132 is communicatively coupled to and in signal communication with the memory 134. The one or more processors are configured to process data and may be implemented in hardware or software. For example, the processor 132 may be 8-bit, 16-bit, 32-bit, 64-bit or of any other suitable architecture. The processor 132 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions (e.g., real-world server instructions 146) to implement the real-world server 130. In this way, processor 132 may be a special-purpose computer designed to implement the functions disclosed herein. In one or more embodiments, the real-world server 130 is implemented using logic units, FPGAs, ASICs, DSPs, or any other suitable hardware. The real-world server 130 is configured to operate as described with reference to FIGS.

1 and 3. For example, the processor 132 may be configured to perform at least a portion of the method 300 as described in FIG. 3.

The memory 134 comprises one or more disks, tape drives, or solid-state drives, and may be used as an over-flow data storage device, to store programs when such programs are selected for execution, and to store instructions and data that are read during program execution. The memory 134 may be volatile or non-volatile and may comprise a read-only memory (ROM), random-access memory (RAM), ternary content-addressable memory (TCAM), dynamic random-access memory (DRAM), and static random-access memory (SRAM).

The memory 134 is operable to store information relating to real-world data file 138, real-world data objects 140, user profile 162 and the real-world server instructions 146. The real-world server instructions 146 may include any suitable set of instructions, logic, rules, or code operable to execute the real-world server 130.

The network interface 136 is configured to enable wired and/or wireless communications. The network interface 136 is configured to communicate data between the real-world server 130 and other devices, systems, or domains (e.g. user devices 104 and 106, and virtual-world server 150). For example, the network interface 136 may comprise a Wi-Fi interface, a LAN interface, a WAN interface, a modem, a switch, or a router. The processor 132 is configured to send and receive data using the network interface 136. The network interface 136 may be configured to use any suitable type of communication protocol as would be appreciated by one of ordinary skill in the art.

Each of the real-world server 130 and the virtual-world server 150 is generally a suitable server (e.g., including a physical server and/or virtual server) operable to store data in a memory (e.g., respective memories 134 and 156) and/or provide access to application(s) or other services. One or both of the real-world server 130 and the virtual-world server 150 may be a backend server associated with a particular entity (e.g., organization) that facilitates conducting data interactions between entities, between one or more users, and/or between a user and an entity. In other embodiments, one or both of the real-world server 130 and the virtual-world server 150 may be organized in a distributed manner, or by leveraging cloud computing technologies. Real-world server 130 may store information which is primarily used to support data interactions performed in the real-world environment. Virtual-world server 150 may store information which is primarily used to support data interactions performed in the virtual environment 102 (e.g., a metaverse environment). It may be noted that the operations performed by the real-world server 130 and the virtual-world server 150 described in embodiments of the present disclosure may be implemented by a single server.

The communication network 195 may facilitate communication within the system 100. This disclosure contemplates the communication network 195 being any suitable network operable to facilitate communication between the first user device 104, second user device 106, real-world server 130, and virtual-world server 150. Communication network 195 may include any interconnecting system capable of transmitting audio, video, signals, data, messages, or any combination of the preceding. Communication network 195 may include all or a portion of a local area network (LAN), a wide area network (WAN), an overlay network, a software-defined network (SDN), a virtual private network (VPN), a packet data network (e.g., the Internet), a mobile telephone network (e.g., cellular networks, such as 4G or 5G), a Plain Old Telephone (POT) network, a wireless data network (e.g., WiFi, WiGig, WiMax, etc.), a Long Term Evolution (LTE) network, a Universal Mobile Telecommunications System (UMTS) network, a peer-to-peer (P2P) network, a Bluetooth network, a Near Field Communication network, a Zigbee network, and/or any other suitable network, operable to facilitate communication between the components of system 100. In other embodiments, system 100 may not have all of these components and/or may have other elements instead of, or in addition to, those above.

Each of the user devices (i.e., first user device 104 and second user device 106) may be any computing device configured to communicate with other devices, such as a server (e.g., real-world server 130, virtual-world server 150), databases, etc. through the communication network 195. Each of the user devices may be configured to perform specific functions described herein and interact with one or both of real-world server 130 and the virtual-world server 150, e.g., via respective user interfaces. Each of the user devices is a hardware device that is generally configured to provide hardware and software resources to a user. Examples of a user device include, but are not limited to, a virtual reality device, an augmented reality device, a laptop, a computer, a smartphone, a tablet, a smart device, an Internet-of-Things (IoT) device, or any other suitable type of device. The user devices may comprise a graphical user interface (e.g., a display), a touchscreen, a touchpad, keys, buttons, a mouse, or any other suitable type of hardware that allows a user to view data and/or to provide inputs into the user device. Each user device may be configured to allow a user to send requests to one or both of real-world server 130 and the virtual-world server 150, or to another user device.

Example User Device

Figure 2:
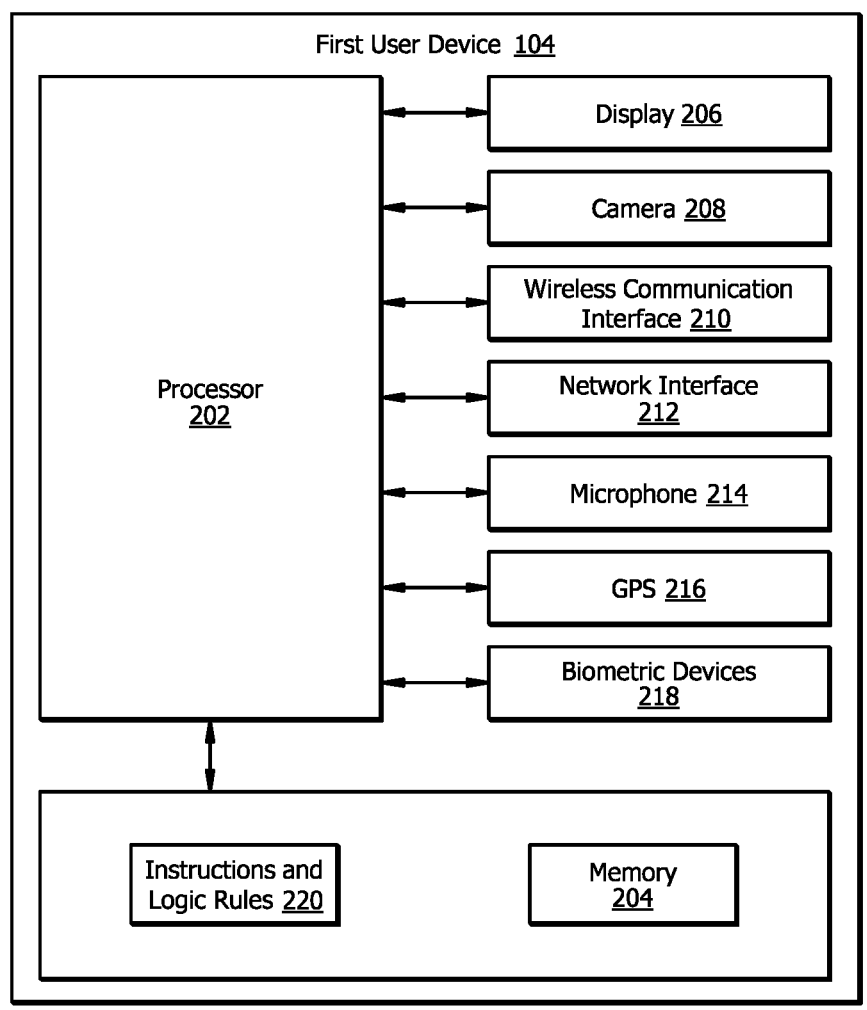
FIG. 2 is a block diagram of an embodiment of the first user device used by the system of FIG. 1.

FIG. 2 is a block diagram of an embodiment of the first user device 104 used by the system of FIG. 1. First user device 104 may be configured to display the virtual environment 102 (referring to FIG. 1) within a field of view of the first user 110 (referring to FIG. 1), capture biometric, sensory, and/or physical information of the first user 110 wearing the first user device 104, and to facilitate an electronic interaction between the first user 110 and the second user 112 (referring to FIG. 1) or between the first user 110 and an entity in the virtual environment 102.

First user device 104 comprises a processor 202, a memory 204, and a display 206. Further embodiments may include a camera 208, a wireless communication interface 210, a network interface 212, a microphone 214, a global position system (GPS) sensor 216, and/or one or more biometric devices 218. First user device 104 may be configured as shown or in any other suitable configuration. For example, first user device 104 may comprise one or more additional components and/or one or more shown components may be omitted.

The processor 202 comprises one or more processors operably coupled to and in signal communication with memory 204, display 206, camera 208, wireless communication interface 210, network interface 212, microphone 214, GPS sensor 216, and biometric devices 218. Processor 202 is configured to receive and transmit electrical signals among one or more of memory 204, display 206, camera 208, wireless communication interface 210, network interface 212, microphone 214, GPS sensor 216, and biometric devices 218. The electrical signals are used to send and receive data (e.g., images captured from camera 208, virtual objects to display on display 206, etc.) and/or to control or communicate with other devices. Processor 202 may be operably coupled to one or more other devices (for example, the real-world server 130 and/or virtual-world server 150 shown in FIG. 1).

The processor 202 is any electronic circuitry including, but not limited to, state machines, one or more central processing unit (CPU) chips, logic units, cores (e.g., a multi-core processor), field-programmable gate array (FPGAs), application specific integrated circuits (ASICs), or digital signal processors (DSPs). The processor 202 may be a programmable logic device, a microcontroller, a microprocessor, or any suitable combination of the preceding. The one or more processors are configured to process data and may be implemented in hardware or software. For example, the processor 202 may be 8-bit, 16-bit, 32-bit, 64-bit or of any other suitable architecture. The processor 202 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions to implement the function disclosed herein, such as some or all of those described with respect to FIGS. 1 and 3. For example, processor 202 may be configured to display virtual objects on display 206, detect hand gestures, identify virtual objects selected by a detected hand gesture, capture biometric information of a user, such as first user 110, via one or more of camera 208, microphone 214, and/or biometric devices 218, and communicate via wireless communication interface 210 with the real-world server 130, virtual-world server 150 and/or second user device 106. In some embodiments, the function described herein is implemented using logic units, FPGAs, ASICs, DSPs, or any other suitable hardware or electronic circuitry.

Figure 3:
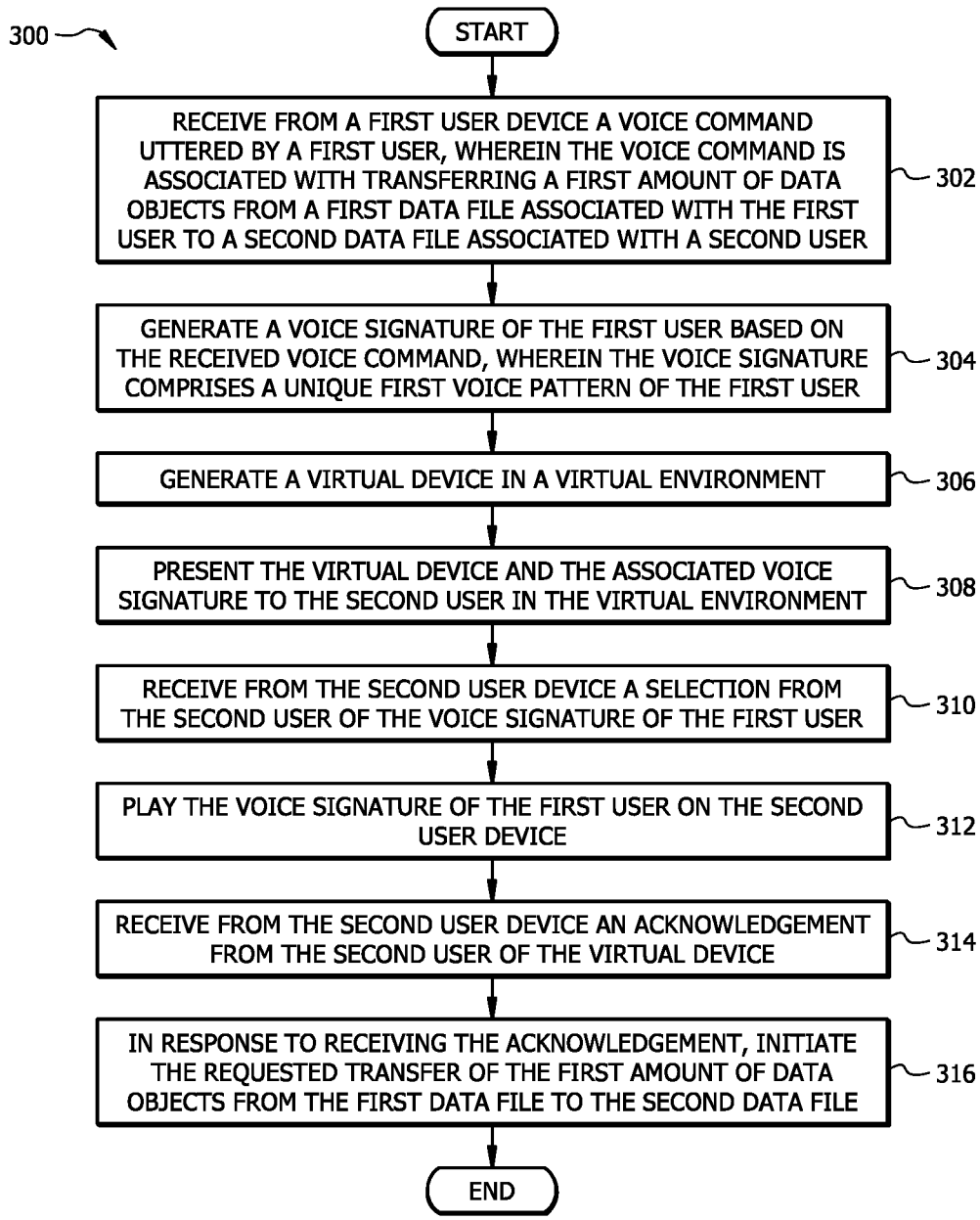
FIG. 3 illustrates a flowchart of an example method for performing a secure interaction in a virtual environment, in accordance with one or more embodiments of the present disclosure.

The memory 204 is operable to store any of the information described with respect to FIGS. 1 and 3 along with any other data, instructions, logic, rules, or code operable to implement the function(s) described herein when executed by processor 202. For example, the memory 204 may store the instructions 220. The memory 204 comprises one or more disks, tape drives, or solid-state drives, and may be used as an over-flow data storage device, to store programs when such programs are selected for execution, and to store instructions and data that are read during program execution. Memory 204 is operable to store, for example, information relating to the identity of the user (e.g., at least a portion of user profile 162), instructions for performing the functions of first user device 104 described herein, and any other data or instructions. The memory 204 may be volatile or non-volatile and may comprise read-only memory (ROM), random-access memory (RAM), ternary content-addressable memory (TCAM), dynamic random-access memory (DRAM), and static random-access memory (SRAM).

Display 206 is configured to present visual information to a user (for example, first user 110 in FIG. 1) in a virtual reality environment, an augmented reality environment or mixed reality environment. In other embodiments, the display 206 is configured to present visual information to the user as the virtual environment 102 (referring to FIG. 1) in real-time. In an embodiment, display 206 is a wearable optical display (e.g., glasses or a headset) configured to reflect projected images and enables a user to see through the display. For example, display 206 may comprise display units, lens, semi-transparent mirrors embedded in an eye glass structure, a visor structure, or a helmet structure. Examples of display units include, but are not limited to, a cathode ray tube (CRT) display, a liquid crystal display (LCD), a liquid crystal on silicon (LCOS) display, a light emitting diode (LED) display, an active-matrix OLED (AMOLED), an organic LED (OLED) display, a projector display, or any other suitable type of display as would be appreciated by one of ordinary skill in the art upon viewing this disclosure. In another embodiment, display 206 is a graphical display on a user device. For example, the graphical display may be the display of a tablet or smart phone configured to display virtual environment 102.

Examples of camera 208 include, but are not limited to, charge-coupled device (CCD) cameras and complementary metal-oxide semiconductor (CMOS) cameras. Camera 208 is configured to capture images of a wearer of first user device 104, such as first user 110. Camera 208 may be configured to capture images continuously, at predetermined intervals, or on-demand. For example, camera 208 may be configured to receive a command from first user 110 to capture an image. In another example, camera 208 is configured to continuously capture images to form a video stream. Camera 208 is communicably coupled to processor 202.

Examples of wireless communication interface 210 include, but are not limited to, a Bluetooth interface, an RFID interface, a near field communication interface, a local area network (LAN) interface, a personal area network interface, a wide area network (WAN) interface, a Wi-Fi interface, a ZigBee interface, or any other suitable wireless communication interface as would be appreciated by one of ordinary skill in the art upon viewing this disclosure. Wireless communication interface 210 is configured to facilitate processor 202 in communicating with other devices. For example, wireless communication interface 210 is configured to enable processor 202 to send and receive signals with other devices, such as second user device 106, the real-world server 130 and/or virtual-world server 150 (referring to FIG. 1). Wireless communication interface 210 is configured to employ any suitable communication protocol.

The network interface 212 is configured to enable wired and/or wireless communications. The network interface 212 is configured to communicate data between the first user device 104 and other network devices, systems, or domain(s). For example, the network interface 212 may comprise a WIFI interface, a local area network (LAN) interface, a wide area network (WAN) interface, a modem, a switch, or a router. The processor 202 is configured to send and receive data using the network interface 212. The network interface 212 may be configured to use any suitable type of communication protocol as would be appreciated by one of ordinary skill in the art.

Microphone 214 is configured to capture audio signals (e.g., voice signals or commands) from a user, such as first user 110. Microphone 214 is configured to capture audio signals continuously, at predetermined intervals, or on-demand. Microphone 214 is communicably coupled to processor 202.

GPS sensor 216 is configured to capture and to provide geographical location information. For example, GPS sensor 216 is configured to provide a geographic location of a user, such as first user 110, employing first user device 104. GPS sensor 216 may be configured to provide the geographic location information as a relative geographic location or an absolute geographic location. GPS sensor 216 may provide the geographic location information using geographic coordinates (i.e., longitude and latitude) or any other suitable coordinate system. GPS sensor 216 is communicably coupled to processor 202.

Examples of biometric devices 218 may include, but are not limited to, retina scanners, fingerprint scanners and facial scanners. Biometric devices 218 are configured to capture information about a person's physical characteristics and to output a biometric signal based on captured information. A biometric signal is a signal that is uniquely linked to a person based on their physical characteristics. For example, biometric device 218 may be configured to perform a retinal scan of the user's eye and to generate a biometric signal for the user based on the retinal scan. As another example, a biometric device 218 is configured to perform a fingerprint scan of the user's finger and to generate a biometric signal for the user based on the fingerprint scan. Biometric device 218 is communicably coupled to processor 202.

Referring back to FIG. 1, in one or more embodiments, one or both of the real-world server 130 and the virtual-world server 150, and one or more user devices (e.g., second user device 106) may be part of an Information Technology (IT) infrastructure of an entity or organization. For example, second user 112 may be a representative of the entity or organization who may use the second user device 106 to enter the virtual environment 102 and virtually interact with one or more users (e.g., first user 110) via the second avatar 116 to provide services to the first user 110.

The real-world server 130 may be configured to allow users (e.g., first user 110) registered with the real-world server 130 to perform one or more data interactions in the real-world environment. Similarly, virtual-world server 150 may be configured to allow users (e.g., first user 110) registered with the virtual-world server 150 to perform one or more data interactions in the virtual environment 102 (e.g., a metaverse environment). When the real-world server 130 and/or the virtual-world server 150 are owned and/or operated by a particular entity or organization (e.g., are part of the IT infrastructure of the entity or organization), being registered with the real-world server 130 and/or the virtual-world server 150 may also be interpreted as being registered with the particular entity or organization. For example, when the first user 110 is registered with the virtual-world server 150, this may be interpreted as the first user 110 being registered with the entity or organization that owns and/or manages the virtual world server 150. In one embodiment, the real-world server 130 and the virtual-world server 150 are owned and/or operated by the same entity/organization. In this context, virtual-world server 150 may be configured to allow users (e.g., first user 110) registered with the real-world server 130 to perform one or more data interactions in the virtual environment 102 (e.g., a metaverse environment). In alternative embodiments, the real-world server 130 and the virtual-world server 150 may be owned and/or operated by different entities/organizations. For example, the real-world server 130 may be owned and/or operated by a first entity and the virtual-world server 150 may be owned and/or operated by a second entity different from the first entity.

In one or more embodiments, as the first user 110 initially registers with the real-world server 130 in the real-world environment, the real-world server 130 may collect several pieces of information from the first user 110 including information relating to the identity of the first user 110 such as legal name, social security number, biometrics (e.g., fingerprints, retina scans, face ID etc.), residence address, phone numbers, assets owned by the user, and copies of government issued documents (e.g., drivers permit, state identity card etc.). This information is stored by real-world server 130 as part of user profile 162 of the first user 110. In one embodiment, at least a portion of the user profile 162 relating to the first user 110 collected in the real-world environment may be stored in the virtual-world server 150. Once the identity of the first user 110 is confirmed and all other information provided by the first user 110 is verified to be correct, the real-world server 130 may generate a real-world data file 138 for the first user 110 in which the first user 110 may store real-world data objects 140 owned by the first user 110. In one example, the first user 110 may engage in a real-world interaction with a service representative managing the real-world server 130 (e.g., physical interaction at an office location, over phone, voice chat etc.) to provide such information that can be used to register the first user 110 at the real-world server 130 and generate the real-world data file 138 of the first user 110. In another example, the first user 110 may engage in a real-world interaction by accessing a webpage provided and managed by the real-world server 130. Once the first user 110 initiates a registration process via the webpage, the real-world server 130 may walk the first user 110 through several steps in which the first user 110 may be requested to provide information necessary to verify the identity of the first user 110 and register the first user 110 with the real-world server 130.

Information relating to the real-world data file 138 of the first user 110 may be stored as part of the user profile 162 of the first user 110. This information may include, but is not limited to, an identity (e.g., unique name or number) of the real-world data file 138, amount of real-world data objects 140 stored in the real-world data file 138, a log of data interactions conducted in relation to the real-world data file 138 and any other information relating to the real-world data file 138.

Once registered with the real-world server 130, the real-world server 130 may allow the first user 110 to perform one or more data interactions in the real-world environment. For example, a real-world data interaction may include transferring one or more real-world data objects 140 from the real-world data file 138 of the first user 110 to a second real-world data file (not shown) of the second user 112 or another entity. Another example data interaction may include receiving one or more real-world data objects 140 in the real-world data file 138 of the first user 110 from the second real-world data file of the second user 112 or another entity. Another example data interaction may include requesting by the first user 110 transfer of real-world data objects from a data file of a second user to a user data file of a third user as part of satisfying an agreement between the first user 110 and the third user. Another example data interaction may include modifying at least a portion of the user profile 162 (e.g., user credentials to access the real-world server, phone numbers, residential address, email address, information relating to user assets etc.) stored at the real-world server 130. It may be noted that a data interaction in accordance with embodiments of the present disclosure refers to any interaction in the real-world environment and/or virtual environment 102 that includes transfer of data between computing nodes (e.g., first user device 104, second user device 106, real-world server 130 and virtual-world server 150).

The first user 110 may additionally register with the virtual-world server 150. In one embodiment, when initially registering with the virtual-world server 150, the first user 110 may provide to the virtual-world server 150 a credential (e.g., username and password) that provides the first user 110 access to the real-world server 130. In one embodiment, a single web page or web portal may allow the first user 110 to register with the real-world server 130 as well as the virtual-world server 150. The first user 110 may first register with the real-world server 130 as described above and generate credentials that allow the first user 110 access to the real-world server 130 and services provided by the real-world server 130. Once registered with the real-world server 130, the web portal may provide the first user 110 an option to additionally register with the virtual-world server 150 which may allow the first user 110 to perform data interactions in the virtual environment 102. Registration with the virtual-world server 150 may include generating a user credential 160 that allows the first user 110 to log in to the virtual-world server 150 and enter the virtual environment 102 via first avatar 114 of the first user 110. Once registered with the virtual-world server 150, the first user 110 may generate a first virtual data file 164 in which the first user 110 may store first virtual data objects 166 owned by the first user 110. In one or more embodiments, the first virtual data file 164 of the first user 110 is associated with the real-world data file 138 of the first user 110. For example, the first virtual data file 164 is a virtual image of the real-world data file 138, wherein the first virtual data objects 166 correspond to the real-world data objects 140. In other words, the first virtual data file 164 is a virtual representation of the real-world data file 138. In another example, the first virtual data file 164 stores a portion of the real-world data objects 140 in the form of first virtual data objects 166. In another example, real-world data objects 140 may be converted to first virtual data objects 166, and vice versa. In this case, there may not be a one-to-one conversion between the real-world data objects 140 and first virtual data objects 166. For example, one real-world data object 140 may be converted to a plurality of first virtual data objects 166, wherein the conversion ratio may dynamically change from time to time. In one embodiment, when the real-world server 130 and the virtual-world server 150 are owned and/or managed by the same entity or organization, the first user 110 may use the same user credential 160 to login to the real-world server 130 as well as the virtual-world server 150.

Information relating to the first virtual data file 164 of the first user 110 may be stored by the virtual-world server 150 as part of the user profile 162 of the first user 110 stored at the virtual-world server 150. This information may include, but is not limited to, an identity of the first virtual data file 164, amount of first virtual data objects 166 stored in the first virtual data file 164, a log of virtual data interactions conducted in the virtual environment 102 in relation to the first virtual data file 164 and any other information relating to the first virtual data file 164.

In certain embodiments, when the real-world server 130 and the virtual-world server 150 are owned and/or managed by different entities, first user 110 may separately register with one of the real-world server 130 and the virtual-world server 150 without registering with the other. For example, when the real-world server 130 is registered with a first entity and the virtual-world server 150 is registered with a second entity different from the first entity, first user 110 may separately register with the virtual-world server 150 without registering or needing to register with the real-world server 130. For example, as the first user 110 separately registers with the virtual-world server 150, the virtual-world server 150 may collect several pieces of information from the first user 110 including information relating to the identity of the user such as legal name, social security number, biometrics (e.g., fingerprints, retina scans, face ID etc.), residence address, phone numbers, assets owned by the user, and copies of government issued documents (e.g., drivers permit, state identity card etc.). This information is stored by virtual-world server 150 as part of user profile 162 of the first user 110. In one embodiment, at least a portion of the user profile 162 relating to the first user 110 collected in by the virtual-world server 150 may be stored in the real-world server 130. Once the identity of the first user 110 is confirmed and all other information provided by the first user 110 is verified to be correct, the virtual-world server 150 may generate the first virtual data file 164 for the first user 110 in which the first user 110 may store first virtual data objects 166 owned by the first user 110.

Once registered with the virtual-world server 150, the virtual-world server 150 may allow the first user 110 to perform one or more virtual data interactions. For example, a virtual data interaction may include transferring one or more first virtual data objects 166 from the first virtual data file 164 of the first user 110 to the second virtual data file 168 of the second user 112 or another entity. Another example data interaction may include receiving one or more first virtual data objects 166 in the first virtual data file 164 of the first user 110 from the second virtual data file 168 of the second user 112 or another entity. Another example data interaction may include requesting by the first user 110 transfer of first virtual data objects 166 from a data file of a second user to a data file of a third user as part of satisfying an agreement between the first user 110 and the third user. Another example data interaction may include modifying at least a portion of the user profile 162 (e.g., user credentials to access the real-world server, phone numbers, residential address, email address, information relating to user assets etc.) stored at the virtual-world server 150.

In one or more embodiments, the first virtual data file 164 is a software application running on a computing node owned and/or operated by the respective user (e.g., first user 110). For example, when the first user 110 desires to receive first virtual data objects 166 from the second virtual data file 168 of the second user 112, first user 110 may direct the second user 112 to a unique cryptographic address (e.g., public key) issued by the first virtual data file 164. In one embodiment, the first virtual data file 164 may not itself store the first virtual data objects 166 but may store information that points to a location of the first virtual data objects 166, for example, on a server (e.g., virtual-world server 150). First virtual data file 164 may be web-based or hardware-based. For example, first virtual data file 164 may be stored in a mobile device or a desktop computer connected to the internet. Additionally or alternatively, first virtual data file 164 may be stored in a device (e.g., USB drive) that is not connected to the network 195.

Voice-Enabled Authentication of an Interaction in the Virtual Environment

Embodiments of the present disclosure discuss techniques for performing a data interaction in the virtual environment 102 using voice-based authentication. Virtual-world server 150 may be configured to process a data interaction requested by the first user 110 to transfer first virtual data objects 166 from the first virtual data file 164 associated with the first user 110 to the second virtual data file 168 associated with the second user 112 using voice command only issued by the first user 110. The techniques discussed herein allow the first user 110 to transfer first virtual data objects 166 to the second virtual data file 168 associated with the second user 112 by using voice commands alone without having to login to the virtual-world server (e.g., by providing user credential 160) and/or entering the virtual environment 102 (e.g., via first avatar 114). By allowing the first user 110 to perform a data interaction associated with the first virtual data file 164 using voice command(s) alone, the disclosed system and method save the time and resources (e.g., processing resources, memory resources, network bandwidth etc.) which would otherwise be expended to have the first user 110 login to the virtual-world server 150 using user credential 160, render at least a portion of the virtual environment 102 and the first avatar 114 on the first user device 104, and receiving selections made by the first user 110 in the virtual environment 102 to initiate the data interaction. Thus, the disclosed system and method improve the speed of processing a data interaction in the virtual environment 102 and further improve processing efficiency of the virtual-world server 150 as well as the first user device 104.

It may be noted that while embodiments of the present disclosure are described with reference to an example transfer of first virtual data objects 166 from the first virtual data file 164 associated with the first user 110 to the second virtual data file 168 associated with the second user 112, a person having ordinary skill in the art may appreciate that the disclosed embodiments apply to transfer of real-world data objects 140 from the real-world data file 138 associated with the first user 110 to another real-world data file (not shown) associated with the second user 112 based processing a voice command issued by the first user 110 in the virtual environment 102.

First user 110 may use the first user device 104 to issue a voice command 191 to transfer a particular amount of the first virtual data objects 166 from the first virtual data file 164 to the second virtual data file 168. In one embodiment, the first user device 104 may be pre-registered with the virtual-world server 150 as an authorized user device associated with the first user 110. In one example, the first user device 104 may be a smart watch having a voice assistant that may be configured to receive and understand voice commands uttered by the first user 110 and take appropriate action. For example, to initiate the transfer of the particular amount of the first virtual data objects 166 from the first virtual data file 164 to the second virtual data file 168, the first user 110 may issue a voice command 191 by uttering "send X data objects to Mr. XYZ". This voice command 191 may be detected and received by the microphone 214 (see FIG. 2) of the first user device 104. Based on the received voice command 191, the first user device 104 (e.g., the voice assistant associated with the smart watch) may determine that the first user 110 intends to perform a data interaction in the virtual environment 102. In response to determining that the first user 110 intends to perform a data interaction in the virtual environment 102, the first user device 104 forwards the voice command 191 to the virtual-world server 150. In one embodiment, the first user device 104 generates an audio file (e.g., .wav file) including a recording of the voice command 191 and transmits the audio file to the virtual-world server 150. In an alternative embodiment, first user device 104 may be configured to forward the voice command 191 to the virtual-world server 150 without decoding voice command 191 and/or determining an intent of the first user 110 based on the voice command 191.

Upon receiving the voice command 191 from the first user device 104, virtual-world server 150 may be configured to verify that the voice command 191 was issued by the first user 110 and not some unauthorized party. For example, based on an identifier (e.g., unique IP address, serial number etc.) of the first user device 104 received with the voice command 191, virtual-world server 150 may determine that the first user device 104 is registered as an authorized user device of the first user 110. However, the virtual-world server 150 may be configured to determine that the voice command 191 received from the first user device 104 was actually uttered by the first user 110 not an unauthorized party. Virtual-world server 150 may be configured to determine whether the voice command 191 was spoken by the first user 110 by authenticating the voice command 191 including determining whether a voice associated with the voice command 191 belongs to the first user 110. In this context, virtual-world server 150 may store a first voice pattern 172 associated with the first user 110 as part of the user profile 162 of the first user 110. The first voice pattern 172 associated with the first user 110 may include a unique set of characteristics associated with the voice of the first user 110. For example, the unique set of characteristics may include, but are not limited to, pitch, resonance, tone, power and quality. To authenticate the voice command 191, virtual-world server 150 may be configured to compare the voice associated with the voice command 191 with the first voice pattern 172 associated with the first user 110. This comparison essentially includes comparing the characteristics of the voice associated with the voice command 191 with the unique set of characteristics associated with the voice of the first user 110. In one embodiment, the virtual-world server 150 may be configured to extract the recording of the voice command 191 from audio file (e.g., .wav file) received from the first user device 104 and compare the extracted audio with the first voice pattern 172. When the voice associated with the voice command 191 matches with the first voice pattern 172 (e.g., the voice command 191 includes at least a portion of the first voice pattern 172), virtual-world server 150 determines that the identity of the first user 110 is authenticated and that the voice command 191 was uttered by the first user 110.

Virtual-world server 150 may be configured to determine an intent of the first user 110 based on the voice command 191 received from the first user device 104. For example, virtual-world server 150 may employ a natural language processing (NLP) algorithm to process the voice command 191 and determine an intent of the first user 110. Following the example stated above, when the voice command 191 includes the command "send X data objects to Mr. XYZ", virtual-world server 150 may determine that the first user 110 intends to transfer X amount of data objects (e.g., virtual or real-world data objects) to another user named "Mr. XYZ". In one embodiment, the command may include an indication of the data file from which the first user 110 desires to make the transfer of the data objects. This is particularly helpful when the first user 110 has multiple registered data files (e.g., real-world data file 138 and first virtual data file 164). For example, the voice command 191 may include "send X data objects from metaverse file to Mr. XYZ". The term "metaverse file" in the voice command 191 may be associated with the first virtual data file 164. For example, the term "metaverse file" may be a registered nick name of the first virtual data file 164 at the virtual-world server 150. In one embodiment, when the first user 110 has only one first virtual data file 164 registered at the virtual-world server 150, the term "metaverse file" may logically refer to the first virtual data file 164 as the only registered data file for use in the virtual environment 102. Thus, in this case, virtual-world server 150 may determine that the first user 110 intends to transfer X amount of first virtual data objects 166 from the first virtual data file 164 to another user named "Mr. XYZ".

Once the intention of the first user 110 has been determined, virtual-world server 150 may be configured to determine interaction metadata 178 associated with the requested data interaction, for example, transfer of the X amount of first virtual data objects 166 from the first virtual data file 164 to another user named "Mr. XYZ". Interaction metadata 178 refers to information relating to and needed for processing the requested transfer of the first virtual data objects 166. For example, virtual-world server 150 may obtain information relating to the first user 110 saved as part of the user profile 162 of the first user 110. The information relating to the first user 110 may include, but is not limited to, full name and address of the first user 110. Virtual-world server 150 may be configured to extract one or more keywords 176 from the voice command 191 which may be used to search the memory 156 for other interaction metadata 178 needed to process the requested transfer. For example, when the command 191 includes "send X data objects from metaverse file to Mr. XYZ", virtual-world server 150 may extract the keywords "X data objects", "metaverse file" and "Mr. XYZ". Based on the keyword "metaverse file", virtual-world server 150 may obtain an identity (e.g., name, IP address etc.) of the first virtual data file 164 associated with the first user 110. Based on the keyword "Mr. XYZ", virtual-world server 150 may determine an identity (e.g., full name, address etc.) of the second user 112 and an identity (e.g., name, IP address etc.) of the second virtual data file 168 associated with the second user 112. In one embodiment, the first user 110 may have registered at the virtual-world server 150 one or more trusted data recipients and respective virtual data files, wherein each recipient is identified by full name and/or nick name and is associated with a virtual data file that can receive data from the first user 110. For example, first user 110 may have registered the second user 112 and associated second virtual data file 168 as a trusted data recipient under the nick name "Mr. XYZ". The virtual-world server 150 may be configured to search the list of trusted data recipients registered by the first user 110 based on the keyword "Mr. XYZ" and determine the identity of the second user 112 and the associated second virtual data file 168 that is to receive the requested data transfer of X first virtual data objects 166 from the first virtual data file 164. Thus, in the above example, the interaction metadata 178 associated with the requested data transfer as determined by the virtual-world server 150 includes the identity of the first user 110 who requested the transfer, the identity of the first virtual data file 164 from which first virtual data objects 166 are to be transferred, X amount of first virtual data objects 166 to be transferred, the identity of the recipient second user 112 that is to receive the transfer, and the identity of the second virtual data file 168 that is to receive the X amount of the first virtual data objects 166.

Virtual-world server 150 may be configured to generate a virtual device 182 that includes at least a portion of the interaction metadata 178 associated with the requested transfer of the first virtual data objects 166 to the second user 112. Virtual device 182 may include a digital token or a digital transfer certificate that includes interaction metadata 178 needed to process the requested transfer and serves as an authorization by the first user 110 of the transfer of the first virtual data objects 166 to the second user 112 in the virtual environment 102. As described below, the second user 112 may use the virtual device 182 to initiate the transfer of the first virtual data objects 166 to the second virtual data file 168 associated with the second user 112. In one embodiment, virtual-world server 150 may be configured to obtain from the memory 156 a device template 180 for use in generating the virtual device 182. In this context, virtual-world server 150 may be configured to store in the memory 156 a plurality of device templates 180, wherein each device template 180 is designed for a particular type of data interaction in the virtual environment 102. For example, an entity that manages the first virtual data file 164 in the virtual environment 102 for the first user 110 may provide and require use of a particular device template 180 for transfer of the first virtual data objects 166 from the first virtual data file 164. The device template 180 may define that the interaction metadata 178 be included in the virtual device 182 and may further define a format for presenting the interaction metadata 178 in the virtual device 182. Virtual-world server 150 may be configured to obtain from the memory 156 the particular device template 180 defined for use in generating virtual devices 182 for transfer of first virtual data objects 166 from the first virtual data file 164. Virtual-world server 150 may be configured to generate the virtual device 182 based on the device template 180 by including the interaction metadata 178 as defined in the device template 180. Following the above example, the virtual device 182 may include the identity of the first user 110 who requested the transfer, the identity of the first virtual data file 164 from which first virtual data objects 166 are to be transferred, X amount of first virtual data objects 166 to be transferred, the identity of the recipient second user 112 that is to receive the transfer, and the identity of the second virtual data file 168 that is to receive the X amount of the first virtual data objects 166.

In one embodiment, the virtual device 182 includes a two-dimensional (2D) or a three-dimensional (3D) image displaying the interaction metadata 178 relating to the requested transfer of the first virtual data objects 166 to the second user 112.

Virtual-world server 150 may be configured to generate a voice signature 184 associated with the first user 110. The voice signature 184 is a unique digital signature of the first user 110 and includes the unique first voice pattern 172 associated with the first user 110. The voice signature 184 may serve as a mechanism to verify the identity of the first user 110 and may be used to verify authenticity of digital assets (e.g., virtual device 182) associated with the first user 110. In one embodiment, the voice signature 184 may include a data file that includes one or more types of voice signatures 184 discussed below.

In one embodiment, virtual-world server 150 may be configured to generate the voice signature 184 having a copy of the unique first voice pattern 172 associated with the first user 110. For example, the voice signature 184 may include the unique set of characteristics associated with the voice of the first user 110 such as one or more of a pitch, a resonance, a tone, a power and a quality associated with the voice of the first user 110. As described below, the unique first voice pattern 172 associated with the first user 110 from the voice signature 184 may be used by the second user 112 to verify the identity of the first user 110 and authenticate the virtual device 182.

In one alternative or additional embodiment, the voice signature 184 generated by virtual-world server 150 may include a synthetic voice signature 186 associated with the first user 110. The synthetic voice signature 186 associated with the first user 110 may include a computer simulation of the voice of the first user 110 generated based on the first voice pattern 172 associated with the first user 110. The synthetic voice signature 186 generated by the virtual-world server 150 may include a message and/or information relating to the requested transfer of the first virtual data objects 166 in a simulated voice of the first user 110. Since the synthetic voice signature 186 includes a simulated voice of the first user 110 generated based on the first voice pattern 172 associated with the first user 110, the synthetic voice signature 186 includes the first voice pattern 172 and can be verified as belonging to the first user 110 by comparing with the first voice pattern 172 stored in the memory 156. In one example, the synthetic voice signature 186 may include a secret passcode (e.g., word(s), number(s) or combinations thereof) in the simulated voice of the first user 110. The secret passcode may be pre-agreed between the first user 110 and the second user 112 to verify interactions between the first user 110 and the second user 112. In another example, the synthetic voice signature 186 may include a message in the simulated voice of the first user 110. The message may include information relating to the transfer of the first virtual data objects 166 to the second user 112 such as a purpose of the transfer, or any other message identifiable by the second user 112 as originating from the first user 110. In another example, the synthetic voice signature 186 may include one or more keywords 176 extracted from the original voice command 191 of the first user 110 as received from the first user device 104. In additional or alternative embodiments, the voice signature 184 may include a copy of the voice command 191 of the first user 110 or a portion thereof in the original voice of the first user 110.

Virtual-world server 150 may be configured to associate the voice signature 184 (e.g., synthetic voice signature 186) of the first user 110 to the virtual device 182 generated for the requested transfer of the first virtual data objects 166. For example, virtual-world server 150 may be configured to generate an interactive visual representation of the voice signature 184 (e.g., an interactive image or control) and place the interactive voice signature 184 on the 2D or 3D image of the virtual device 182 in the virtual environment 102. As further described below, the voice signature 184 associated with the virtual device 182 may be used to authenticate the virtual device 182.

Virtual-world server 150 may be configured to present the virtual device 182 along with the associated voice signature 184 in the virtual environment 102 to the second user 112. For example, once the virtual device 182 and the voice signature 184 have been generated and associated, virtual-world server 150 may be configured to transmit a notification (e.g., text message, email etc.) to a second user device 106 of the second user 112. In one embodiment, the second user device 106 may be pre-registered as an authorized user device of the second user 112. The notification may inform the second user 112 that the virtual device 182 has been generated to transfer data objects to the second user 112. Upon receiving the notification, the second user 112 may login to the virtual-world server 150 using a login credential of the second user 112 and enter the virtual environment 102 via second avatar 116. Once the second user 112 enters the virtual environment 102, virtual-world server 150 may be configured to present (e.g., display) to the second user 112 the virtual device 182 along with the associated voice signature 184. Alternatively, virtual-world server 150 may be configured to present the virtual device 182 along with the associated voice signature 184 in the virtual environment 102 to the second user 112 whenever the second user 112 (e.g., via second avatar 116) enters the virtual environment 102. Presenting the virtual device 182 and associated voice signature 184 in the virtual environment 102 may include rendering and displaying on a second user device 106 (e.g., VR headset, smartphone etc.) the visual representation (e.g., 2D or 3D image) of the virtual device 182 including or along with the interactive visual representation of the voice signature 184. The voice signature 184 may be placed (e.g., displayed) on a portion of the virtual device 182 or adjacent to the virtual device 182.

It may be noted that while embodiments of the present disclosure describe placing a visual interactive voice signature 184 on the 2D or 3D image of the virtual device 182 in the virtual environment 102, a person having ordinary skill in the art may appreciate that the voice signature 184 may be presented to the second user 112 separately from the virtual device 182.

The virtual-world server 150 may allow the second user 112 to verify the authenticity of the virtual device 182 based on the virtual signature 184 associated with the virtual device 182. Verifying the authenticity of the virtual device 182 based on the virtual signature 184 allows the second user 112 to verify that the virtual device 182 was generated in response to a command (e.g., voice command 191) issued by the first user 110 and not some unauthorized party. This may allow the second user 112 to avoid unauthorized and/or erroneous transfers of data objects into the second virtual data file 168. As described below, the virtual device 182 may be authenticated using one more of several methods.

When the virtual device 182 and the associated interactive voice signature 184 of the first user 110 is presented in the virtual environment 102 to the second user 112, the second user 112 may select the interactive voice signature 184 as part of verifying the virtual device 182. Selecting the interactive voice signature 184 may include clicking on an image that represents the interactive voice signature in the virtual environment 102 using an input mechanism of the second user device 106. In response to receiving a selection of the voice signature 184 from the second user device 106, virtual-world server 150 may be configured to take one or more actions depending on the contents of the voice signature 184.

In one embodiment, voice signature 184 includes a synthetic voice signature 186 associated with the first user 110 and/or an actual voice of the first user 110. In this embodiment, in response to receiving the selection of the voice signature 184 from the second user device 106, virtual-world server 150 may be configured to play the voice signature 184 on the second user device 106. For example, the voice signature 184 may include an audio file (e.g., .wav file) which the virtual-world server 150 may render and play on one or more speakers associated with the second user device 106 of the second user 112. Playing the voice signature 184 on the second user device 106 may allow the second user 112 to verify the authenticity of the virtual device 182. In one example, the voice signature 184 may include a secret passcode (e.g., word(s), number(s) or combinations thereof) in the simulated voice or actual voice of the first user 110. The secret passcode may be pre-agreed between the first user 110 and the second user 112 to verify interactions between the first user 110 and the second user 112. Thus, upon hearing the secret passcode, the second user 112 may know that the virtual device 182 was generated in response to a command issued by the first user 110 and that the virtual device is authentic. In another example, the voice signature 184 may include a message in the simulated voice or actual voice of the first user 110. The message may include information relating to the transfer of the first virtual data objects 166 to the second user 112 such as a purpose of the transfer, or any other message identifiable by the second user 112 as originating from the first user 110. Thus, upon hearing the message that includes the purpose of the transfer, the second user 112 may recognize the purpose of the transfer and determine that the virtual device 182 is authentic. Additionally or alternatively, the second user 112 may be familiar with the voice of the first user 110. Thus, hearing the voice signature 184 in the simulated voice (e.g., synthetic voice signature 186) or actual voice of the first user 110 may allow the second user 112 to authenticate the virtual device 182 by recognizing the voice of the first user 110.

Upon verifying the voice signature 184 (e.g., based on hearing the voice signature 184 played on the second user device 106), the second user 112 may provide an acknowledgement 192 of the virtual device 182. The acknowledgement 192 of the virtual device 182 serves as an acceptance by the second user 112 of the transfer of the first virtual data objects 166. The virtual-world server 150 may be configured to provide one or more mechanisms for the second user 112 to provide the acknowledgement 192. In one example, virtual-world server 150 may provide e.g., display) a virtual acknowledge button in the virtual environment 102 rendered on the second user device 106, which the second user 112 may select to transmit the acknowledgement 192 from the second user device 106 to the virtual-world server 150. In another example, virtual-world server 150 may allow the second user 112 to provide the acknowledgement 192 using voice command. In one example, the second user device 106 may be a smart watch having a voice assistant that may be configured to receive and understand voice commands uttered by the second user 112 and take appropriate action. For example, to transmit the acknowledgment 192, the second user 112 may issue a voice command by uttering "accept transfer". This voice command may be detected and received by the microphone of the second user device 106. Based on the received voice command, the second user device 106 (e.g., the voice assistant associated with the smart watch) may determine that the second user 112 intends to acknowledge the transfer associated with the virtual device 182. In response to determining that the second user 112 intends to acknowledge the transfer, the second user device 106 transmits an acknowledgement 192 (e.g., including the voice command) to the virtual-world server 150. In one embodiment, the second user device 106 generates an audio file (e.g., .wav file) including a recording of the voice command and transmits the audio file to the virtual-world server 150 as the acknowledgement 192 of the virtual device 182. In an alternative embodiment, second user device 106 may be configured to forward the voice command to the virtual-world server 150 as the acknowledgement 192 without decoding voice command and/or determining an intent of the second user 112 based on the voice command.

In an additional or alternative embodiment, upon receiving the acknowledgement 192 including the voice command issued by the second user 112, virtual-world server 150 may be configured to verify that the voice command was issued by the second user 112 and not some unauthorized party. For example, based on an identifier (e.g., unique IP address, serial number etc.) of the second user device 106 that transmitted the acknowledgement 192, virtual-world server 150 may determine that the second user device 106 is registered as an authorized user device of the second user 112. Virtual-world server 150 may further be configured to determine that the voice command received from the second user device 106 was actually uttered by the second user 112 not an unauthorized party. Virtual-world server 150 may be configured to determine whether the voice command was spoken by the second user 112 by authenticating the voice command including determining whether a voice associated with the voice command belongs to the second user 112. In this context, virtual-world server 150 may store a second voice pattern 174 associated with the second user 112 as part of the user profile 162 of the second user 112. The second voice pattern 174 associated with the second user 112 may include a unique set of characteristics associated with the voice of the second user 112. For example, the unique set of characteristics may include, but are not limited to, pitch, resonance, tone, power and quality. To authenticate the voice command of the second user 112, virtual-world server 150 may be configured to compare the voice associated with the voice command with the second voice pattern 174 associated with the second user 112. This comparison essentially includes comparing the characteristics of the voice associated with the voice command with the unique set of characteristics associated with the voice of the second user 112. In one embodiment, the virtual-world server 150 may be configured to extract the recording of the voice command from audio file (e.g., .wav file) received from the second user device 106 and compare the extracted audio with the second voice pattern 174. When the voice associated with the voice command matches with the second voice pattern 174 (e.g., the voice command includes at least a portion of the second voice pattern 174), virtual-world server 150 determines that the identity of the second user 112 is authenticated and that the acknowledgement issued by the second user 112.

Virtual-world server 150 may be configured to initiate the transfer of the first virtual data objects 166 requested by the first user 110 in response to receiving the acknowledgement 192 from the second user 112. In embodiments when the second user provides the acknowledgement 192 via a voice command, virtual-world server 150 may be configured to process the transfer only upon successfully verifying the voice command was issued by the second user 112. Initiating the transfer may include requesting a processing entity (not shown) to process the requested transfer based on the virtual device 182 and/or the interaction metadata 178 associated with the virtual device 182.

In additional or alternative embodiments, virtual-world server 150 may be configured to authenticate the virtual device 182 based on the voice signature 184 before initiating the transfer (e.g., in response to acknowledgement 192 received from the second user 112). As described above, the voice signature 184 may include a simulated voice (e.g., synthetic voice signature 186) and/or an actual voice of the first user 110. This means that if the voice signature 184 is authentic, the voice signature 184 includes the first voice pattern 172 associated with the first user 110. Virtual-world server 150 may be configured to authenticate the virtual device 182 by comparing the voice signature 184 with the first voice pattern 172 and verifying that a set of voice characteristics associated with the voice signature 184 match with the unique set of voice characteristics associated with the first voice pattern 172 of the first user 110. Virtual-world server 150 may be configured to initiate the requested transfer only upon successfully verifying that the voice signature 184 belongs to the first user 110. In one example, virtual-world server 150 may not initiate the requested transfer when the voice signature 184 does not match the first voice pattern 172 of the first user 110, even after receiving an acknowledgement 192 from the second user 112. Thus, this authentication may provide an additional level of security.

In an example banking use case, the system and methods disclosed in accordance with embodiments of the present disclosure may allow users (e.g., first user 110 and second user 112) to perform secure data interactions within the virtual environment 102. In this context, the real-world server 130 may be owned and/or operated by a bank. The virtual-world server 150 may be operated by the same bank or may be operated by another entity. The real world-data file 138 may correspond to a real-world bank account of the first user 110 and the real-world data objects 140 may correspond to the real-world funds in the bank account of the first user 110. Similarly, first virtual data file 164 may correspond to a digital wallet of the first user 110 and the first virtual data objects 166 may correspond to digital currency owned by the first user 110. The second virtual data file 168 may correspond to a digital wallet of the second user 112 and the second virtual data objects 170 may correspond to digital currency owned by the second user 112. A transfer of first virtual data objects 166 from the first virtual data file 164 to the second virtual data file 168 associated with the second user 112 may include transfer of digital currency from a first digital wallet of the first user 110 to a second digital wallet of the second user 112.

FIG. 3 illustrates a flowchart of an example method 300 for performing a secure interaction in a virtual environment 102, in accordance with one or more embodiments of the present disclosure. Method 300 may be performed by the virtual-world server 150 shown in FIG. 1.

At operation 302, virtual-world server 150, receives from a first user device 104 a voice command 191 uttered by a first user 110, wherein the voice command 191 is associated with transferring a first amount of data objects (e.g., first virtual data objects 166) from a first data file (e.g., first virtual data file 164) associated with the first user 110 to a second data file (e.g., second virtual data file 168) associated with a second user 112.

As described above, first user 110 may use the first user device 104 to issue a voice command 191 to transfer a particular amount of the first virtual data objects 166 from the first virtual data file 164 to the second virtual data file 168. In one embodiment, the first user device 104 may be pre-registered with the virtual-world server 150 as an authorized user device associated with the first user 110. In one example, the first user device 104 may be a smart watch having a voice assistant that may be configured to receive and understand voice commands uttered by the first user 110 and take appropriate action. For example, to initiate the transfer of the particular amount of the first virtual data objects 166 from the first virtual data file 164 to the second virtual data file 168, the first user 110 may issue a voice command 191 by uttering "send X data objects to Mr. XYZ". This voice command 191 may be detected and received by the microphone 214 (see FIG. 2) of the first user device 104. Based on the received voice command 191, the first user device 104 (e.g., the voice assistant associated with the smart watch) may determine that the first user 110 intends to perform a data interaction in the virtual environment 102. In response to determining that the first user 110 intends to perform a data interaction in the virtual environment 102, the first user device 104 forwards the voice command 191 to the virtual-world server 150. In one embodiment, the first user device 104 generates an audio file (e.g., .wav file) including a recording of the voice command 191 and transmits the audio file to the virtual-world server 150. In an alternative embodiment, first user device 104 may be configured to forward the voice command 191 to the virtual-world server 150 without decoding voice command 191 and/or determining an intent of the first user 110 based on the voice command 191.

Upon receiving the voice command 191 from the first user device 104, virtual-world server 150 may be configured to verify that the voice command 191 was issued by the first user 110 and not some unauthorized party. For example, based on an identifier (e.g., unique IP address, serial number etc.) of the first user device 104 received with the voice command 191, virtual-world server 150 may determine that the first user device 104 is registered as an authorized user device of the first user 110. However, the virtual-world server 150 may be configured to determine that the voice command 191 received from the first user device 104 was actually uttered by the first user 110 not an unauthorized party. Virtual-world server 150 may be configured to determine whether the voice command 191 was spoken by the first user 110 by authenticating the voice command 191 including determining whether a voice associated with the voice command 191 belongs to the first user 110. In this context, virtual-world server 150 may store a first voice pattern 172 associated with the first user 110 as part of the user profile 162 of the first user 110. The first voice pattern 172 associated with the first user 110 may include a unique set of characteristics associated with the voice of the first user 110. For example, the unique set of characteristics may include, but are not limited to, pitch, resonance, tone, power and quality. To authenticate the voice command 191, virtual-world server 150 may be configured to compare the voice associated with the voice command 191 with the first voice pattern 172 associated with the first user 110. This comparison essentially includes comparing the characteristics of the voice associated with the voice command 191 with the unique set of characteristics associated with the voice of the first user 110. In one embodiment, the virtual-world server 150 may be configured to extract the recording of the voice command 191 from audio file (e.g., .wav file) received from the first user device 104 and compare the extracted audio with the first voice pattern 172. When the voice associated with the voice command 191 matches with the first voice pattern 172 (e.g., the voice command 191 includes at least a portion of the first voice pattern 172), virtual-world server 150 determines that the identity of the first user 110 is authenticated and that the voice command 191 was uttered by the first user 110.

At operation 304, virtual-world server 150, generates a voice signature 184 of the first user 110 based on the received voice command 191, wherein the voice signature 184 includes a unique first voice pattern 172 of the first user 110.

As described above, virtual-world server 150 may be configured to generate a voice signature 184 associated with the first user 110. The voice signature 184 is a unique digital signature of the first user 110 and includes the unique first voice pattern 172 associated with the first user 110. The voice signature 184 may serve as a mechanism to verify the identity of the first user 110 and may be used to verify authenticity of digital assets (e.g., virtual device 182) associated with the first user 110. In one embodiment, the voice signature 184 may include a data file that includes one or more types of voice signatures 184 discussed below.

In one embodiment, virtual-world server 150 may be configured to generate the voice signature 184 having a copy of the unique first voice pattern 172 associated with the first user 110. For example, the voice signature 184 may include the unique set of characteristics associated with the voice of the first user 110 such as one or more of a pitch, a resonance, a tone, a power and a quality associated with the voice of the first user 110. As described below, the unique first voice pattern 172 associated with the first user 110 from the voice signature 184 may be used by the second user 112 to verify the identity of the first user 110 and authenticate the virtual device 182.

In one alternative or additional embodiment, the voice signature 184 generated by virtual-world server 150 may include a synthetic voice signature 186 associated with the first user 110. The synthetic voice signature 186 associated with the first user 110 may include a computer simulation of the voice of the first user 110 generated based on the first voice pattern 172 associated with the first user 110. The synthetic voice signature 186 generated by the virtual-world server 150 may include a message and/or information relating to the requested transfer of the first virtual data objects 166 in a simulated voice of the first user 110. Since the synthetic voice signature 186 includes a simulated voice of the first user 110 generated based on the first voice pattern 172 associated with the first user 110, the synthetic voice signature 186 includes the first voice pattern 172 and can be verified as belonging to the first user 110 by comparing with the first voice pattern 172 stored in the memory 156. In one example, the synthetic voice signature 186 may include a secret passcode (e.g., word(s), number(s) or combinations thereof) in the simulated voice of the first user 110. The secret passcode may be pre-agreed between the first user 110 and the second user 112 to verify interactions between the first user 110 and the second user 112. In another example, the synthetic voice signature 186 may include a message in the simulated voice of the first user 110. The message may include information relating to the transfer of the first virtual data objects 166 to the second user 112 such as a purpose of the transfer, or any other message identifiable by the second user 112 as originating from the first user 110. In another example, the synthetic voice signature 186 may include one or more keywords 176 extracted from the original voice command 191 of the first user 110 as received from the first user device 104. In additional or alternative embodiments, the voice signature 184 may include a copy of the voice command 191 of the first user 110 or a portion thereof in the original voice of the first user 110.

At operation 306, virtual-world server 150, generates a virtual device 182 in the virtual environment 102, wherein the virtual device 182 comprises metadata (e.g., interaction metadata 178) relating to the transfer of the data objects (e.g., first virtual data objects 166), wherein the metadata at least comprises one or more of an identity of the first data file, an identity of the second data file and the first amount of data objects.

As described above, virtual-world server 150 may be configured to determine an intent of the first user 110 based on the voice command 191 received from the first user device 104. For example, virtual-world server 150 may employ a natural language processing (NLP) algorithm to process the voice command 191 and determine an intent of the first user 110. Following the example stated above, when the voice command 191 includes the command "send X data objects to Mr. XYZ", virtual-world server 150 may determine that the first user 110 intends to transfer X amount of data objects (e.g., virtual or real-world data objects) to another user named "Mr. XYZ". In one embodiment, the command may include an indication of the data file from which the first user 110 desires to make the transfer of the data objects. This is particularly helpful when the first user 110 has multiple registered data files (e.g., real-world data file 138 and first virtual data file 164). For example, the voice command 191 may include "send X data objects from metaverse file to Mr. XYZ". The term "metaverse file" in the voice command 191 may be associated with the first virtual data file 164. For example, the term "metaverse file" may be a registered nick name of the first virtual data file 164 at the virtual-world server 150. In one embodiment, when the first user 110 has only one first virtual data file 164 registered at the virtual-world server 150, the term "metaverse file" may logically refer to the first virtual data file 164 as the only registered data file for use in the virtual environment 102. Thus, in this case, virtual-world server 150 may determine that the first user 110 intends to transfer X amount of first virtual data objects 166 from the first virtual data file 164 to another user named "Mr. XYZ".

Once the intention of the first user 110 has been determined, virtual-world server 150 may be configured to determine interaction metadata 178 associated with the requested data interaction, for example, transfer of the X amount of first virtual data objects 166 from the first virtual data file 164 to another user named "Mr. XYZ". Interaction metadata 178 refers to information relating to and needed for processing the requested transfer of the first virtual data objects 166. For example, virtual-world server 150 may obtain information relating to the first user 110 saved as part of the user profile 162 of the first user 110. The information relating to the first user 110 may include, but is not limited to, full name and address of the first user 110. Virtual-world server 150 may be configured to extract one or more keywords 176 from the voice command 191 which may be used to search the memory 156 for other interaction metadata 178 needed to process the requested transfer. For example, when the command 191 includes "send X data objects from metaverse file to Mr. XYZ", virtual-world server 150 may extract the keywords "X data objects", "metaverse file" and "Mr. XYZ". Based on the keyword "metaverse file", virtual-world server 150 may obtain an identity (e.g., name, IP address etc.) of the first virtual data file 164 associated with the first user 110. Based on the keyword "Mr. XYZ", virtual-world server 150 may determine an identity (e.g., full name, address etc.) of the second user 112 and an identity (e.g., name, IP address etc.) of the second virtual data file 168 associated with the second user 112. In one embodiment, the first user 110 may have registered at the virtual-world server 150 one or more trusted data recipients and respective virtual data files, wherein each recipient is identified by full name and/or nick name and is associated with a virtual data file that can receive data from the first user 110. For example, first user 110 may have registered the second user 112 and associated second virtual data file 168 as a trusted data recipient under the nick name "Mr. XYZ". The virtual-world server 150 may be configured to search the list of trusted data recipients registered by the first user 110 based on the keyword "Mr. XYZ" and determine the identity of the second user 112 and the associated second virtual data file 168 that is to receive the requested data transfer of X first virtual data objects 166 from the first virtual data file 164. Thus, in the above example, the interaction metadata 178 associated with the requested data transfer as determined by the virtual-world server 150 includes the identity of the first user 110 who requested the transfer, the identity of the first virtual data file 164 from which first virtual data objects 166 are to be transferred, X amount of first virtual data objects 166 to be transferred, the identity of the recipient second user 112 that is to receive the transfer, and the identity of the second virtual data file 168 that is to receive the X amount of the first virtual data objects 166.

Virtual-world server 150 may be configured to generate a virtual device 182 that includes at least a portion of the interaction metadata 178 associated with the requested transfer of the first virtual data objects 166 to the second user 112. Virtual device 182 may include a digital token or a digital transfer certificate that includes interaction metadata 178 needed to process the requested transfer and serves as an authorization by the first user 110 of the transfer of the first virtual data objects 166 to the second user 112 in the virtual environment 102. As described below, the second user 112 may use the virtual device 182 to initiate the transfer of the first virtual data objects 166 to the second virtual data file 168 associated with the second user 112. In one embodiment, virtual-world server 150 may be configured to obtain from the memory 156 a device template 180 for use in generating the virtual device 182. In this context, virtual-world server 150 may be configured to store in the memory 156 a plurality of device templates 180, wherein each device template 180 is designed for a particular type of data interaction in the virtual environment 102. For example, an entity that manages the first virtual data file 164 in the virtual environment 102 for the first user 110 may provide and require use of a particular device template 180 for transfer of the first virtual data objects 166 from the first virtual data file 164. The device template 180 may define that the interaction metadata 178 be included in the virtual device 182 and may further define a format for presenting the interaction metadata 178 in the virtual device 182. Virtual-world server 150 may be configured to obtain from the memory 156 the particular device template 180 defined for use in generating virtual devices 182 for transfer of first virtual data objects 166 from the first virtual data file 164. Virtual-world server 150 may be configured to generate the virtual device 182 based on the device template 180 by including the interaction metadata 178 as defined in the device template 180. Following the above example, the virtual device 182 may include the identity of the first user 110 who requested the transfer, the identity of the first virtual data file 164 from which first virtual data objects 166 are to be transferred, X amount of first virtual data objects 166 to be transferred, the identity of the recipient second user 112 that is to receive the transfer, and the identity of the second virtual data file 168 that is to receive the X amount of the first virtual data objects 166.

In one embodiment, the virtual device 182 includes a two-dimensional (2D) or a three-dimensional (3D) image displaying the interaction metadata 178 relating to the requested transfer of the first virtual data objects 166 to the second user 112.

Virtual-world server 150 may be configured to associate the voice signature 184 (e.g., synthetic voice signature 186) of the first user 110 to the virtual device 182 generated for the requested transfer of the first virtual data objects 166. For example, virtual-world server 150 may be configured to generate an interactive visual representation of the voice signature 184 (e.g., an interactive image or control) and place the interactive voice signature 184 on the 2D or 3D image of the virtual device 182 in the virtual environment 102. As further described below, the voice signature 184 associated with the virtual device 182 may be used to authenticate the virtual device 182.

At operation 308, virtual-world server 150, presents the virtual device 182 and the associated voice signature 184 to the second user 112 in the virtual environment 102.

As described above, virtual-world server 150 may be configured to present the virtual device 182 along with the associated voice signature 184 in the virtual environment 102 to the second user 112. For example, once the virtual device 182 and the voice signature 184 have been generated and associated, virtual-world server 150 may be configured to transmit a notification (e.g., text message, email etc.) to a second user device 106 of the second user 112. In one embodiment, the second user device 106 may be pre-registered as an authorized user device of the second user 112. The notification may inform the second user 112 that the virtual device 182 has been generated to transfer data objects to the second user 112. Upon receiving the notification, the second user 112 may login to the virtual-world server 150 using a login credential of the second user 112 and enter the virtual environment 102 via second avatar 116. Once the second user 112 enters the virtual environment 102, virtual-world server 150 may be configured to present (e.g., display) to the second user 112 the virtual device 182 along with the associated voice signature 184. Alternatively, virtual-world server 150 may be configured to present the virtual device 182 along with the associated voice signature 184 in the virtual environment 102 to the second user 112 whenever the second user 112 (e.g., via second avatar 116) enters the virtual environment 102. Presenting the virtual device 182 and associated voice signature 184 in the virtual environment 102 may include rendering and displaying on a second user device 106 (e.g., VR headset, smartphone etc.) the visual representation (e.g., 2D or 3D image) of the virtual device 182 including or along with the interactive visual representation of the voice signature 184. The voice signature 184 may be placed (e.g., displayed) on a portion of the virtual device 182 or adjacent to the virtual device 182.

At operation 310, virtual-world server 150, receives from the second user device 106 a selection from the second user 112 of the voice signature 184 of the first user 110.

As described above, the virtual-world server 150 may allow the second user 112 to verify the authenticity of the virtual device 182 based on the virtual signature 184 associated with the virtual device 182. Verifying the authenticity of the virtual device 182 based on the virtual signature 184 allows the second user 112 to verify that the virtual device 182 was generated in response to a command (e.g., voice command 191) issued by the first user 110 and not some unauthorized party. This may allow the second user 112 to avoid unauthorized and/or erroneous transfers of data objects into the second virtual data file 168. As described below, the virtual device 182 may be authenticated using one or more of several methods.

When the virtual device 182 and the associated interactive voice signature 184 of the first user 110 is presented in the virtual environment 102 to the second user 112, the second user 112 may select the interactive voice signature 184 as part of verifying the virtual device 182. Selecting the interactive voice signature 184 may include clicking on an image that represents the interactive voice signature in the virtual environment 102 using an input mechanism of the second user device 106.

At operation 312, virtual-world server 150, plays the voice signature 184 of the first user 110 on the second user device 106.

As described above, in response to receiving a selection of the voice signature 184 from the second user device 106, virtual-world server 150 may be configured to take one or more actions depending on the contents of the voice signature 184.

In one embodiment, voice signature 184 includes a synthetic voice signature 186 associated with the first user 110 and/or an actual voice of the first user 110. In this embodiment, in response to receiving the selection of the voice signature 184 from the second user device 106, virtual-world server 150 may be configured to play the voice signature 184 on the second user device 106. For example, the voice signature 184 may include an audio file (e.g., .wav file) which the virtual-world server 150 may render and play on one or more speakers associated with the second user device 106 of the second user 112. Playing the voice signature 184 on the second user device 106 may allow the second user 112 to verify the authenticity of the virtual device 182. In one example, the voice signature 184 may include a secret passcode (e.g., word(s), number(s) or combinations thereof) in the simulated voice or actual voice of the first user 110. The secret passcode may be pre-agreed between the first user 110 and the second user 112 to verify interactions between the first user 110 and the second user 112. Thus, upon hearing the secret passcode, the second user 112 may know that the virtual device 182 was generated in response to a command issued by the first user 110 and that the virtual device is authentic. In another example, the voice signature 184 may include a message in the simulated voice or actual voice of the first user 110. The message may include information relating to the transfer of the first virtual data objects 166 to the second user 112 such as a purpose of the transfer, or any other message identifiable by the second user 112 as originating from the first user 110. Thus, upon hearing the message that includes the purpose of the transfer, the second user 112 may recognize the purpose of the transfer and determine that the virtual device 182 is authentic. Additionally or alternatively, the second user 112 may be familiar with the voice of the first user 110. Thus, hearing the voice signature 184 in the simulated voice (e.g., synthetic voice signature 186) or actual voice of the first user 110 may allow the second user 112 to authenticate the virtual device 182 by recognizing the voice of the first user 110.

At operation 314, virtual-world server 150, receives from the second user device 106 an acknowledgement 192 from the second user 112 of the virtual device 182.

As describe above, upon successfully verifying the voice signature 184 (e.g., based on hearing the voice signature 184 played on the second user device 106), the second user 112 may provide an acknowledgement 192 of the virtual device 182. The acknowledgement 192 of the virtual device 182 serves as an acceptance by the second user 112 of the transfer of the first virtual data objects 166. The virtual-world server 150 may be configured to provide one or more mechanisms for the second user 112 to provide the acknowledgement 192. In one example, virtual-world server 150 may provide e.g., display) a virtual acknowledge button in the virtual environment 102 rendered on the second user device 106, which the second user 112 may select to transmit the acknowledgement 192 from the second user device 106 to the virtual-world server 150. In another example, virtual-world server 150 may allow the second user 112 to provide the acknowledgement 192 using voice command. In one example, the second user device 106 may be a smart watch having a voice assistant that may be configured to receive and understand voice commands uttered by the second user 112 and take appropriate action. For example, to transmit the acknowledgment 192, the second user 112 may issue a voice command by uttering "accept transfer". This voice command may be detected and received by the microphone of the second user device 106. Based on the received voice command, the second user device 106 (e.g., the voice assistant associated with the smart watch) may determine that the second user 112 intends to acknowledge the transfer associated with the virtual device 182. In response to determining that the second user 112 intends to acknowledge the transfer, the second user device 106 transmits an acknowledgement 192 (e.g., including the voice command) to the virtual-world server 150. In one embodiment, the second user device 106 generates an audio file (e.g., .wav file) including a recording of the voice command and transmits the audio file to the virtual-world server 150 as the acknowledgement 192 of the virtual device 182. In an alternative embodiment, second user device 106 may be configured to forward the voice command to the virtual-world server 150 as the acknowledgement 192 without decoding voice command and/or determining an intent of the second user 112 based on the voice command.

In an additional or alternative embodiment, upon receiving the acknowledgement 192 including the voice command issued by the second user 112, virtual-world server 150 may be configured to verify that the voice command was issued by the second user 112 and not some unauthorized party. For example, based on an identifier (e.g., unique IP address, serial number etc.) of the second user device 106 that transmitted the acknowledgement 192, virtual-world server 150 may determine that the second user device 106 is registered as an authorized user device of the second user 112. Virtual-world server 150 may further be configured to determine that the voice command received from the second user device 106 was actually uttered by the second user 112 not an unauthorized party. Virtual-world server 150 may be configured to determine whether the voice command was spoken by the second user 112 by authenticating the voice command including determining whether a voice associated with the voice command belongs to the second user 112. In this context, virtual-world server 150 may store a second voice pattern 174 associated with the second user 112 as part of the user profile 162 of the second user 112. The second voice pattern 174 associated with the second user 112 may include a unique set of characteristics associated with the voice of the second user 112. For example, the unique set of characteristics may include, but are not limited to, pitch, resonance, tone, power and quality. To authenticate the voice command of the second user 112, virtual-world server 150 may be configured to compare the voice associated with the voice command with the second voice pattern 174 associated with the second user 112. This comparison essentially includes comparing the characteristics of the voice associated with the voice command with the unique set of characteristics associated with the voice of the second user 112. In one embodiment, the virtual-world server 150 may be configured to extract the recording of the voice command from audio file (e.g., .wav file) received from the second user device 106 and compare the extracted audio with the second voice pattern 174. When the voice associated with the voice command matches with the second voice pattern 174 (e.g., the voice command includes at least a portion of the second voice pattern 174), virtual-world server 150 determines that the identity of the second user 112 is authenticated and that the acknowledgement issued by the second user 112.

At operation 316, virtual-world server 150, in response to receiving the acknowledgement 192, initiates the requested transfer of the first amount of data objects (e.g., first virtual data objects 166) from the first data file (e.g., first virtual data file 164) to the second data file (e.g., second virtual data file 168).

As described above, virtual-world server 150 may be configured to initiate the transfer of the first virtual data objects 166 requested by the first user 110 in response to receiving the acknowledgement 192 from the second user 112. In embodiments when the second user provides the acknowledgement 192 via a voice command, virtual-world server 150 may be configured to process the transfer only upon successfully verifying the voice command was issued by the second user 112. Initiating the transfer may include requesting a processing entity (not shown) to process the requested transfer based on the virtual device 182 and/or the interaction metadata 178 associated with the virtual device 182.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system comprising:
   a memory that stores a unique first voice pattern associated with a first user; and
   a processor communicatively coupled to a first user device operated by the first user, a second user device operated by a second user and the memory, wherein the processor is configured to:
   receive from the first user device a voice command uttered by the first user for transferring a first amount of data objects from a first data file associated with the first user to a second data file associated with the second user;
   authenticate the voice command by verifying, based at least in part upon the voice command, that the voice command is uttered by the first user;
   determine, based at least in part upon words extracted from the voice command, at least an identity of the first data file, an identity of the second data file, and the first amount of data objects to be transferred from the first data file to the second data file;
   generate a voice signature of the first user based on the received voice command, wherein the voice signature comprises the unique first voice pattern of the first user;
   generate a virtual device in a virtual environment, wherein:
   the virtual device comprises metadata relating to the transfer of the data objects, wherein the metadata at least comprises one or more of the identity of the first data file, the identity of the second data file and the first amount of data objects; and
   the virtual device comprises an image displaying the metadata relating to the transfer of the data objects;

generate an interactive visual representation of the voice signature;
embed the interactive visual representation of the voice signature in the virtual device;
present the virtual device and the associated voice signature to the second user in the virtual environment, wherein presenting the virtual device comprises displaying the image of the virtual device including the metadata relating to the transfer of the data objects and the interactive visual representation of the voice signature;
receive from the second user device a selection from the second user of the voice signature of the first user, wherein the selection of the voice signature comprises the selection of the interactive visual representation of the voice signature displayed as part of the virtual device;
in response to receiving the selection of the interactive visual representation of the voice signature displayed as part of the virtual device, play the voice signature of the first user on the second user device;
receive from the second user device an acknowledgement from the second user of the virtual device;
in response to receiving the acknowledgement, initiate the requested transfer of the first amount of data objects from the first data file to the second data file.

2. The system of claim 1, wherein the processor is further configured to:
   compare a voice of the first user from the voice command to the first voice pattern of the first user stored in the memory, wherein the first voice pattern of the first user comprises a unique set of characteristics associated with the voice of the first user;
   determine based on the comparison that the voice of the first user comprises the first voice pattern;
   in response to determining that the voice of the first user comprises the first voice pattern, determine that an identity of the first user is authenticated; and
   associate the voice signature of the first user with the virtual device after the identity of the first user is authenticated.

3. The system of claim 2, wherein the processor is further configured to:
   generate a synthetic voice signature of the first user based on the voice command, wherein the voice signature of the first user comprises the synthetic voice signature, wherein the synthetic voice signature comprises a computer simulation of the voice of the first user having the first voice pattern of the first user.

4. The system of claim 1, wherein the voice signature comprises information relating to the transfer of the data objects in an original voice of the first user or a synthetic voice of the first user.

5. The system of claim 1, wherein the processor is further configured to:
   extract one or more keywords from the voice command uttered by the first user, wherein the keywords relate to the transfer of the data objects, wherein the voice signature comprises the one or more keywords.

6. The system of claim 1, wherein the processor is further configured to:
   extract from the memory based on the voice command, the metadata relating to the transfer of the data objects and a virtual device template associated transferring data objects; and
   generate the virtual device by including extracted metadata in the virtual device template.

7. The system of claim 1, wherein the virtual device comprises a three-dimensional (3D) image displaying the metadata relating to the transfer of the data objects and an interactive visual representation of the virtual signature.

8. The system of claim 1, wherein:
the acknowledgement from the second user of the voice signature received from the second user device comprises a voice acknowledgement; and
the processor is further configured to:
compare a voice of the second user from the voice acknowledgement to a second voice pattern of the second user stored in the memory, wherein the second voice pattern of the second user comprises a unique set of characteristics associated with the voice of the second user;
determine based on the comparison that the voice of the second user comprises the second voice pattern;
in response to determining that the voice of the second user comprises the second voice pattern, determine that an identity of the second user is authenticated; and
initiate the requested transfer of the first amount of data objects from the first data file to the second data file in response to determining that the identity of the second user is authenticated.

9. The system of claim 1, wherein:
the memory stores a user credential associated with the first user; and
the processor is further configured to:
receive from the first user device the user credential associated with the first user, wherein the user credential provides the first user access to the virtual environment; and
authorize, based on the user credential, a first avatar of the first user to enter the virtual environment.

10. A method for performing secure interactions in a virtual environment, comprising:
receiving from a first user device operated by a first user a voice command uttered by the first user for transferring a first amount of data objects from a first data file associated with the first user to a second data file associated with a second user;
authenticating the voice command by verifying, based at least in part upon the voice command, that the voice command is uttered by the first user;
determining, based at least in part upon words extracted from the voice command, at least an identity of the first data file, an identity of the second data file, and the first amount of data objects to be transferred from the first data file to the second data file;
generating a voice signature of the first user based on the received voice command, wherein the voice signature comprises a unique first voice pattern of the first user;
generating a virtual device in the virtual environment, wherein:
the virtual device comprises metadata relating to the transfer of the data objects, wherein the metadata at least comprises one or more of the identity of the first data file, the identity of the second data file and the first amount of data objects; and
the virtual device comprises an image displaying the metadata relating to the transfer of the data objects;
generating an interactive visual representation of the voice signature;
embedding the interactive visual representation of the voice signature in the virtual device;
presenting the virtual device and the associated voice signature to the second user in the virtual environment, wherein presenting the virtual device comprises displaying the image of the virtual device including the metadata relating to the transfer of the data objects and the interactive visual representation of the voice signature;
receiving from a second user device operated by the second user a selection from the second user of the voice signature of the first user, wherein the selection of the voice signature comprises the selection of the interactive visual representation of the voice signature displayed as part of the virtual device;
in response to receiving the selection of the interactive visual representation of the voice signature displayed as part of the virtual device, playing the voice signature of the first user on the second user device;
receiving from the second user device an acknowledgement from the second user of the virtual device;
in response to receiving the acknowledgement, initiating the requested transfer of the first amount of data objects from the first data file to the second data file.

11. The method of claim 10, further comprising:
comparing a voice of the first user from the voice command to the first voice pattern of the first user stored in the memory, wherein the first voice pattern of the first user comprises a unique set of characteristics associated with the voice of the first user;
determining based on the comparison that the voice of the first user comprises the first voice pattern;
in response to determining that the voice of the first user comprises the first voice pattern, determining that an identity of the first user is authenticated; and
associating the voice signature of the first user with the virtual device after the identity of the first user is authenticated.

12. The method of claim 11, further comprising:
generating a synthetic voice signature of the first user based on the voice command, wherein the voice signature of the first user comprises the synthetic voice signature, wherein the synthetic voice signature comprises a computer simulation of the voice of the first user having the first voice pattern of the first user.

13. The method of claim 10, wherein the voice signature comprises information relating to the transfer of the data objects in an original voice of the first user or a synthetic voice of the first user.

14. The method of claim 10, further comprising:
extracting one or more keywords from the voice command uttered by the first user, wherein the keywords relate to the transfer of the data objects, wherein the voice signature comprises the one or more keywords.

15. The method of claim 10, further comprising:
extracting from the memory based on the voice command, the metadata relating to the transfer of the data objects and a virtual device template associated transferring data objects; and
generating the virtual device by including extracted metadata in the virtual device template.

16. A non-transitory computer-readable medium storing instructions that when executed by a processor cause the processor to:
receive from a first user device operated by a first user a voice command uttered by the first user for transferring a first amount of data objects from a first data file associated with the first user to a second data file associated with a second user;

authenticate the voice command by verifying, based at least in part upon the voice command, that the voice command is uttered by the first user;

determine, based at least in part upon words extracted from the voice command, at least an identity of the first data file, an identity of the second data file, and the first amount of data objects to be transferred from the first data file to the second data file;

generate a voice signature of the first user based on the received voice command, wherein the voice signature comprises a unique first voice pattern of the first user;

generate a virtual device in the virtual environment, wherein:
  the virtual device comprises metadata relating to the transfer of the data objects, wherein the metadata at least comprises one or more of an identity of the first data file, an identity of the second data file and the first amount of data objects; and
  the virtual device comprises an image displaying the metadata relating to the transfer of the data objects;

generate an interactive visual representation of the voice signature;

embed the interactive visual representation of the voice signature in the virtual device;

present the virtual device and the associated voice signature to the second user in the virtual environment, wherein presenting the virtual device comprises displaying the image of the virtual device including the metadata relating to the transfer of the data objects and the interactive visual representation of the voice signature;

receive from a second user device operated by the second user a selection from the second user of the voice signature of the first user, wherein the selection of the voice signature comprises the selection of the interactive visual representation of the voice signature displayed as part of the virtual device;

in response to receiving the selection of the interactive visual representation of the voice signature displayed as part of the virtual device, play the voice signature of the first user on the second user device;

receive from the second user device an acknowledgement from the second user of the virtual device;

in response to receiving the acknowledgement, initiate the requested transfer of the first amount of data objects from the first data file to the second data file.

17. The non-transitory computer-readable medium of claim 16, wherein the instructions further cause the processor to:

compare a voice of the first user from the voice command to the first voice pattern of the first user stored in the memory, wherein the first voice pattern of the first user comprises a unique set of characteristics associated with the voice of the first user;

determine based on the comparison that the voice of the first user comprises the first voice pattern;

in response to determining that the voice of the first user comprises the first voice pattern, determine that an identity of the first user is authenticated; and associate the voice signature of the first user with the virtual device after the identity of the first user is authenticated.

18. The non-transitory computer-readable medium of claim 17, wherein the instructions further cause the processor to:

generate a synthetic voice signature of the first user based on the voice command, wherein the voice signature of the first user comprises the synthetic voice signature, wherein the synthetic voice signature comprises a computer simulation of the voice of the first user having the first voice pattern of the first user.

19. The non-transitory computer-readable medium of claim 16, wherein the voice signature comprises information relating to the transfer of the data objects in an original voice of the first user or a synthetic voice of the first user.

20. The non-transitory computer-readable medium of claim 16, wherein the instructions further cause the processor to:

extract one or more keywords from the voice command uttered by the first user, wherein the keywords relate to the transfer of the data objects, wherein the voice signature comprises the one or more keywords.

* * * * *

UNITED STATES PATENT AND TRADEMARK OFFICE
CERTIFICATE OF CORRECTION

PATENT NO. : 12,020,692 B1
APPLICATION NO. : 18/318895
DATED : June 25, 2024
INVENTOR(S) : Venkata Karthik Ryali et al.

It is certified that error appears in the above-identified patent and that said Letters Patent is hereby corrected as shown below:

On the Title Page

In item (54), delete "Secure Interactions in a Virtual Environment Using Electronic Voice" and insert -- Secure Interactions in a Virtual Environment Using Electronic Voice Signature --, therefor.

In the Specification

In Column 1, Lines 1-3, delete "Secure Interactions in a Virtual Environment Using Electronic Voice" and insert -- Secure Interactions in a Virtual Environment Using Electronic Voice Signature --, therefor.

Signed and Sealed this
Twenty-first Day of January, 2025

Coke Morgan Stewart
*Acting Director of the United States Patent and Trademark Office*